Dec. 1, 1959 J. BUGOSH 2,915,475
FIBROUS ALUMINA MONOHYDRATE AND ITS PRODUCTION
Filed Dec. 29, 1958 3 Sheets-Sheet 1

1μ

1μ

1μ

1μ

INVENTOR
JOHN BUGOSH

BY *Albert B. Griggs*
ATTORNEY

Dec. 1, 1959    J. BUGOSH    2,915,475
FIBROUS ALUMINA MONOHYDRATE AND ITS PRODUCTION
Filed Dec. 29, 1958    3 Sheets-Sheet 2

INVENTOR
JOHN BUGOSH
BY *Albert R. Triggs.*
ATTORNEY

United States Patent Office

2,915,475
FIBROUS ALUMINA MONOHYDRATE AND ITS PRODUCTION

John Bugosh, Wilmington, Del., assignor to E. I. du Pont de Nemours and Company, Wilmington, Del., a corporation of Delaware Application December 29, 1958, Serial No. 783,602

16 Claims. (Cl. 252—313)

This invention relates to fibrous alumina monohydrate characterized by having the boehmite crystal lattice.

Figure 11:
Figure 12:
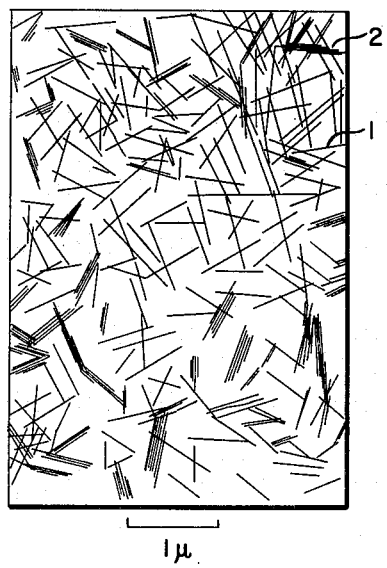
Figure 13:
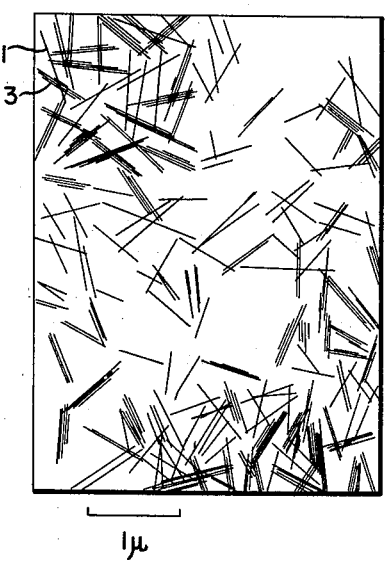
Figure 14:
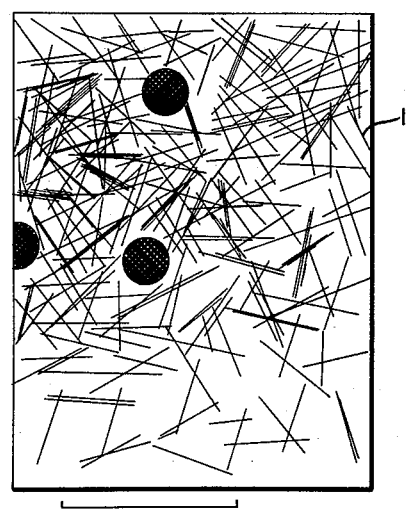

Figures 6, 7, 8, 9, and 10 are curves required in consecutive steps for determining the time, $\theta$, required to depolymerize half of a product of the invention in acid;

Figure 11 is a pen-and-ink drawing made from a photomicrograph at 26,000 diameters' magnification of the product of Example 23;

Figure 12 is a similar showing of the product of Example 24 at 18,000 diameters;

Figure 13 is a similar showing of the product of Example 26 at 18,000 diameters; and Figure 14 is a similar showing of the product of Example 27 at 35,000 diameters.

In processes of the invention broadly, an aqueous dispersion of alumina is prepared and this is heated in the presence of a strong acid radical such as the chloride ion of hydrochloric acid. The concentration of the alumina and the acid radical are adjusted as will be further described hereinafter, and it is preferred that the ratio of acid radical to alumina be maintained within limits further to be described.

Products of the invention can of course be produced in other ways as by heating in the presence of acetic or formic acids as will be hereinafter described.

The aqueous dispersion of alumina is heated according to the invention and as a result of this heating under the conditions of the invention, the alumina forms fibrous alumina monohyrdate having the boehmite crystal lattice. Fibrous alumina monohydrate will sometimes be referred to hereafter as "fibrous boehmite" because of the similarity of its crystal lattice to that of naturally occurring boehmite.

Preferred processes of the invention effect removal of forms of alumina other than fibrous alumina monohydrate having the boehmite crystal lattice or convert them to such alumina. Acid radicals can also be removed from the product.

Depending upon the specific process conditions selected, the fibrous alumina product will be in the form of fibrils which have one or more dimensions in the colloidal range. Such fibrils can form aggregates of large fibers made up of assemblies of fibrils disposed parallel to the length of the fibers.

A preferred group of products of the invention are colloidal sols of the fibrils or fibers in water or organic media. The fibrils or aggregates can be used in the form of sols or dispersions in water or other liquids, or they can be dried from the sols or dispersions and used as dried products.

In a preferred aspect of the invention the fibrils or aggregates of fibrils are dried by removing water from them in the presence of an organic liquid that is partially water-miscible to produce fluffy products of high specific surface area. If the organic liquid chosen is an alcohol, surface esterification of the boehmite can be effected. A preferred dry product is an easily redispersible powder which will give a stable sol of fibrous alumina particles almost indistinguishable from the sol from which the powder was prepared. A particularly preferred dry product can be made by spray drying an aqua-sol of the invention in a conventional manner. Still further product and process modifications will be described hereafter.

THE ALUMINA STARTING MATERIAL

Considering the processes of the invention in somewhat greater detail, it is first to be noted that alumina is provided in the form of an aqueous dispersion. The alumina used has such a molecular structure, degree of hydration, and particle size that the time, $\theta$, required to depolymerize half of a sample in acid into aluminum ions is less than 10 minutes and is preferably less than one minute.

The $\theta$ value is useful in characterizing the alumina to be used in processes of the invention and in defining the process conditions specifically applicable to each such alumina. The $\theta$ value is also useful in characterizing products of the invention.

The $\theta$ value for a particular alumina starting material is quantitatively expressed as the time in minutes required for the depolymerization of half of a sample of the alumina in the presence of excess hydrochloric acid at a temperature of 98° C.

The $\theta$ value of an alumina starting material can be determined as follows. An amount of the alumina sample equivalent to 4.8 grams of $Al_2O_3$ is weighed out. One hundred and eleven milliliters of 5.0 N HCl is heated to 98° C. The mole ratio of acid to alumina is thus 12:1. Distilled water sufficient with the alumina and acid to make a total of 200 grams is measured out. The water is added to the alumina sample and the mixture is heated to 98° C. The diluted alumina sample and acid are mixed, stirred and transferred to a stoppered bottle and placed in a controlled temperature bath held at 98° C. If the alumina sample is a sol or dispersion which is not stable or which is not readily prepared at a concentration such that 4.8 grams as $Al_2O_3$ can be contained in the amount of water involved in this technique, then the amounts of acid and alumina can be reduced but maintained in the ratio of 12:1 moles as above.

Ten gram samples are taken at intervals. Each is diluted to 100 grams with distilled water and quenched to 25° C. to arrest depolymerization. Each is titrated immediately with 0.5 Normal sodium hydroxide.

Instead of using 0.5 Normal sodium hydroxide, more or less concentrated sodium hydroxide solutions can be used depending upon the concentration of the alumina sample and the fraction of the sample depolymerized. The selection of a sodium hydroxide concentration for the titration follows standard analytical techniques.

One sample is taken immediately and others are taken at measured time intervals of about, say, three to five minutes. If it is found that the sample is rapidly depolymerized then a special effort can be made to effect titration as soon as possible after adding the acid to the alumina and as frequently as possible thereafter. If the sample is more slowly depolymerized then the time intervals can be extended.

The results of the titration are interpreted as in the determination of the concentration of a weak acid in the presence of a stronger one. As the base is added to the system any excess of the unreacted hydrochloric acid is first neutralized with the base until the pH rises rather rapidly to about pH 3.5. The aluminum chloride, or other aluminum salt, acts as a buffer and the pH does not rise further until it has been neutralized. The titration is continued until the pH rises to about 8. More precisely the inflection point is reached at 7.25. The moles of sodium hydroxide used to effect neutralization between pH 3.5 and 7.25 is then divided by 3 to give moles of aluminum ion in the system. This type of titration is discussed in greater detail in Treadwell et al. Helvetia Chim. Acta 15 (1932), 980.

Instead of determining the concentration of depolymerized alumina ions by titration one can instead use other standard methods for determining aluminum ion concentration in the presence of polymerized alumina. For example, colorometric determinations, polarographic determinations, or gravimetric determinations can be used. The procedure above given, however, is rapid, accurate, and convenient when the sample does not contain interfering substances like acetic acid or iron, titratable in the same pH range.

After the amount of alumina in each of the samples taken has been determined as by titration, these quantities can be plotted against time. The time required to effect depolymerization of half of the alumina can then readily be picked from the resulting graph. As has been noted briefly above, if the time intervals were not well selected in the first instance then a new set of samples should be taken over shorter periods or over longer periods as required to give a satisfactory plot. The method of plotting such data and its interpretation is further described hereafter in connection with determining $\theta$ for products of the invention.

The alumina starting materials are rapidly depolymerizable in acid, having a $\theta$ value of ten minutes or less or preferably one minute or less.

In forming dispersions of alumina in water to be used in processes of the invention, there can be used as starting materials basic aluminum chloride, basic aluminum nitrate, aluminum hydroxide, alumina gels, or colloidal solutions of alumina. In all of these, alumina is present in the aqueous system in a dispersed condition. Aluminum is associated with oxygen and is probably in some degree of hydration. In the aqueous dispersions employed in the processes of the invention, it will be associated, therefore, with oxygen, with hydroxyl, with water, and with an acid radical such as chloride.

It is not feasible to determine the precise degree or character of hydration of the alumina or the mode of combination of the oxygen, the acid radical and water in the system. It is nevertheless the fact that the aluminum present is undoubtedly combined in some manner with oxygen and upon evaporation and ignition of the solution, a residue of $Al_2O_3$ is obtained. In aqueous solutions or dispersions suitable for use according to the invention, it will accordingly be possible to dry the solution, ignite the residue, and determine the $Al_2O_3$ content. Thus, in referring to "alumina" in the aqueous dispersions used, it will be understood that the term signifies the $Al_2O_3$ content as so determined and not that the aluminum in the dispersions is necessarily present as the specific compound $Al_2O_3$.

Therefore, in speaking of the alumina as dispersed in an aqueous system, it will be understood that this term is used to include solutions such as those of a basic aluminum chloride, colloidal dispersions, or colloidal solutions such as various aluminum hydroxide sols, or suspensions of highly hydrated alumina such as precipitated aluminum hydroxide.

Considering typical materials with a $\theta$ less than 10 which serve as a source for alumina in the processes of the invention, there can be mentioned solutions of aluminum chloride which have been partly neutralized with a base to form a basic aluminum chloride. Similar solutions can be made as shown in Huehn and Haufe U.S. Patent, 2,196,016, April 2, 1940, by dissolving metallic aluminum in aqueous solutions of aluminum nitrate or aluminum halides under controlled conditions. There can also be used as starting materials basic aluminum nitrates prepared according to U.S. Patent 2,127,504 and German Patent 444,517. It is observed that nitrates have the advantage over chlorides that they can be treated in stainless steel equipment without undue corrosion.

A suitable basic aluminum nitrate is one prepared by heating an aluminum nitrate nona hydrate melt to 150° C. This yields a basic aluminum nitrate $Al(OH)_2NO_3$ as shown in the above U.S. Patent 2,127,504. This product is then heated further to remove oxides of nitrogen and to obtain a basic aluminum nitrate of higher aluminum to nitrate ratio. This ratio would be in the range of $Al_2O_3:NO_3$ of 1:1 to 4:1. A particularly preferred range of $Al_2O_3:NO_3$ is from 1.2:1 to 2.0:1.

Freshly precipitated aluminum hydroxide which has been carefully washed to remove salts will also serve to form dispersions of alumina. This can be dispersed mechanically in water and a strong acid added to obtain the conditions which are preferred for use in processes of the invention.

An alumina gel well suited for use in processes of the invention can be prepared by precipitating a basic aluminum carbonate by the addition of a sodium carbonate solution to a solution of an aluminum salt. The basic aluminum carbonate gel thus prepared contains carbon dioxide which can be displaced by heating or, more easily, by heating after the addition of a small amount of the acid to be used in the subsequent process. Thus there can be used a small amount of hydrochloric acid, nitric acid, or another of the acids hereafter disclosed for use in processes of the invention. A discussion of methods of characterization of gels of various types is found in E. Calvert et al., Soc. Chim. de France, Bull. (5) 20, 99–108 (1953).

Sols of amorphous alumina suitable for use in processes of the invention can also be prepared by the electrodialysis of solutions of aluminum nitrate, for example, to produce aqueous dispersions of alumina having the desired quantity of nitrate radicals. Sols can be used which have been prepared by the ion exchange of aluminum salts with ion exchangers.

In the above discussion it has been assumed that a particular alumina is homogeneous and contains but one form of alumina. It will, of course, be understood that mixtures of alumina containing more or less of various types of either crystalline or amorphous alumina can be present in a single sample.

In carrying out processes of the invention, the alumina as an aqueous dispersion or as a sol in water is preferably free from impurities and compounds other than the alumina and the acid radical which will be described in more detail hereafter. Soluble salts such as sodium chloride or sodium nitrate may be present in many commercial sols, gels, and salt solutions, and it is not imperative that they be removed. It is, of course, preferred that the concentration of such inactive materials or impurities, be maintained at as low a figure as practical. Examples will be given hereinafter of the use of dispersions which do contain such salts. It is particularly important that there be at the most only small amounts of compounds of silicon, boron, and molybdenum as impurities. All of these tend to block fiber formation. This tendency is especially pronounced if a boron compound is copolymerized with the alumina. Small amounts of silica will normally be present but the level should be kept as low as practicable. To this end it will often be desirable, especially when operating at high temperatures say above 250° C., to operate processes of the invention in equipment which is not lined with glass or other siliceous material. Other soluble salts can aid dispersibility of dry products or they may be wanted in the product for other reasons and can be left in, or added to, the starting materials.

THE PROCESS CONDITIONS

In processes of the invention an aqueous, acidic dispersion of alumina is heated until fibrous alumina monohydrate having the boehmite crystal lattice is formed.

When fibrous alumina is prepared according to the invention using as a starting material an alumina with a low degree of polymerization such as basic aluminum chloride, the reaction is effected by the joining together of small units. This is a polymerization-type of reaction.

If the alumina which is used as a starting material is highly polymerized the reaction may proceed first by a depolymerization to lower molecular weight units followed by a repolymerization to fibrous alumina.

However, the formation of fibrous alumina monohydrate having the boehmite crystal lattice may be the result of a localized rearrangement of the already polymerized material.

In any even the first step is to form a suspension in water of the alumina starting material. If the material is a sol then of course it is already suspended. If it is water soluble at the pH of the reaction then it is simply dissolved in water which contains the acid to be used in the process.

If the alumina is not readily soluble in the acidic system to be used in the process it can simply be suspended by stirring. Generally, if a highly polymerized alumina is used the particles should be of such a size that they will pass through a 100 mesh screen, or preferably at a size to pass through a 300 mesh screen. It will be understood that the suitability of a particular alumina as to particle size and character can be determined, as already shown, by the $\theta$ value for the material.

The process conditions which principally affect the character of the product obtained are:
 (1) Acids used.
 (2) Concentration of $Al_2O_3$,
 (3) Concentration of acid,
 (4) Ratio of $Al_2O_3$ to acid,
 (5) Operating temperature, and
 (6) Temperature-time relation.

1. Acids used

The aqueous dispersions treated according to process of the invention contain an acid radical. By this, it is of course meant that there is present in the solution an acid radical titratable with sodium hydroxide. This excludes, for example, the chloride in salts such as sodium chloride and similar acid radicals in other neutral salts which may be present in the dispersion. The acid radicals can be present, for example, in solutions of basic aluminum chloride. In such solutions, the chloride ions are titratable with alkali. Thus a sample of the solution can be titrated with a standard solution of sodium hydroxide until the end point is reached at a pH of 7.25. The titration value gives a measure of the concentration of acid radicals present in the solution and will, of course, not include anions of neutral salts such as those of sodium chloride.

This may be stated in another way by saying that the acid radical concentration is the amount of anion in the aqueous dispersion in excess of that stoichiometrically required to form normal salts with all cations other than aluminum-containing cations.

The acid radicals used in aqueous dispersions according to the invention are those of strong monobasic acids such as which will have a dissociation constant greater than 0.1 at 25° C. Typical of such acids are hydrochloric, nitric, perchloric, iodic, hydrobromic and trichloroacetic.

2. Concentration of $Al_2O_3$

The concentration of alumina as $Al_2O_3$ can be widely varied without greatly modifying the character of the products produced. The upper limit on the alumina concentration is fixed by the excessive, irreversible aggregation of the product. If a concentration of more than about 1.6 molar $Al_2O_3$ is used at temperatures below about 250° C., the products produced are so badly and irreversibly aggregated that they are not preferred products of this invention. The tendency toward aggregation depends, however, on the temperature of the reaction as well as upon the concentration of the alumina used. In general, if temperatures considerably above 250° C. are used, it is then possible to produce preferred products of this invention at alumina concentrations as high as 3 molar.

Below an $Al_2O_3$ concentration of about 0.05 mole per liter, products of the invention are not obtained. The molarity of $Al_2O_3$ should not exceed about 1.5 for the preferred processes of the invention.

Alternatively it may be stated with respect to preferred processes of the invention that the concentration of alumina can be varied between 0.05 and 1.6 moles per liter when temperatures below 250° C. are used. The concentrations can be varied between 1.6 and 3.0 moles per liter when temperatures above 250° C. are used. It is preferred to operate below 250° C.

3. Concentration of acid

The upper limit of the acid anion concentration should not greatly exceed 4.2 molar.

The lower limit of the acid radical concentration cannot fall below a value of approximately 0.05 molar without limiting the efficiency of the process. The hydrogen ion probably functions as a catalyst in the production of fibrous alumina monohydrate having the boehmite crystal lattice and it may be that at a concentration below about 0.05 molar there is too little acid present to have enough value as a catalyst for the reaction to proceed at an appreciable rate.

In referring to "acid radical concentration" or "acid anion concentration" reference is made to the discussion earlier in the application to the definition of acid radical as that titratable with sodium hydroxide.

For aluminas as above generally described the acid radical concentration in the aqueous dispersion should have at least a molarity of 0.05 of one or more of the acid radicals described. In preferred processes of the invention the molarity will not greatly exceed about 4. It is still more preferred to operate with a molarity for the acid radical no higher than about 1. The term "molarity" is used herein, of course, to mean the moles of acid radical per liter of aqueous dispersion.

4. Ratio of alumina to acid

The relative proportions of alumina to acid radical can be considerably varied and it will usually be preferred to use an aqueous dispersion in which the molarity of the acid radical is from about one-fourth the $Al_2O_3$ molarity to a molarity equal to that of the $Al_2O_3$ plus 0.2. In most words, the molarity of the acid radical is from:

$$0.25\ (Al_2O_3)\ \text{to}\ (Al_2O_3)+0.2$$

where $(Al_2O_3)$ is the alumina molarity in the aqueous dispersion calculated on the basis of $Al_2O_3$.

More specifically it is preferred to operate with a molarity of the acid radical from 0.5 ($Al_2O_3$) to ($Al_2O_3$) +0.2.

It will be noted that while the conditions recited are preferred for the strong acids, it is permissible to use large amounts of weak acids such as acetic and formic acids as hereinafter described. Such weak acids do not ionize completely and an excess does not trouble the reaction. Thus the molarity of acid radical can extend upwardly to 4 ($Al_2O_3$) or even as high as, say 6 ($Al_2O_3$) or even higher.

5. Operating temperatures

An aqueous dispersion of alumina prepared as above described and containing an appropriate amount of an acid radical of the type shown is heated in an autoclave, usually with agitation or stirring, according to processes of the invention for such a time as to convert the alumina to a fibrous form of alumina monohydrate having the boehmite crystal lattice.

Generally the lowest temperature at which the process can be conducted without excessively long time is 120° C. Temperatures in excess of about 250° C. are not preferred. Above 400° C. the boehmite form is not entirely stable and other crystalline forms which are more stable begin to appear.

While temperature has been discussed as if it were constant throughout processes of the invention it will be understood that this is not necessarily so. Frequently it will be found desirable to charge an alumina sol into an autoclave and raise its temperature over a period of time. The temperature will usually start near room temperature, will be raised fairly slowly to the desired temperature, and then the autoclave charge will be cooled before it is discharged. As is suggested elsewhere, the reaction can be conducted under conditions such that the time required for heating up and cooling down is small. The temperatures above described refer to the maximum temperature reached and this is ordinarily the temperature at which the charge is held for the bulk of the heating time. Though it will be understood that a variety of heating times can be used.

6. Temperature-time relation

An aqueous dispersion of the alumina prepared as above described and containing an acid radical of the type shown is heated according to processes of the invention for such a time as to effect the growth of fibrous alumina monohydrate having the boehmite crystal lattice. At temperatures as low as, say, 120° C., extremely long periods of time are required to effect growth of the alumina fibers. Additionally at such low temperatures there can be a competitive formation of other large particle size alumina modifications such as prisms of gibbsite.

It will be understood that the higher the temperature used, the shorter the time required to effect formation of a fiber or fibril of a given character. The times can vary widely, of course, as different types of products are to be produced, and as different types of starting material are used. Specific examples will be given hereinafter of typical times in specific processes of the invention. In general, it may be noted that if a temperature around 220° C. is used, heating for a few minutes up to an hour or so will be sufficient. On the other hand, at about 160° C., fibrils of increasing length are obtained with times from say about one-half hour to about one day. Beneficial results have been obtained by heating sols for 50 to 100 hours at 160° C. but such long heating times are impractical in most commercial operations.

While temperatures above 250° C. can be employed for very brief periods of time, of the order of a few minutes, prolonged heating for periods of more than about one-half hour will lead to the production of ultimate fibril units which are too thick to be the most preferred products of the invention.

It is to be observed of the heating times and the temperatures used that it will in general be desired to produce fibrils two dimensions of which are in the colloidal range. Times and temperatures which lead to much larger products are not preferred.

It will be evident from what has been said that the time of heating will depend upon other process conditions and will be affected most by temperatures in practical operation. Under particular temperature conditions samples can be withdrawn from time to time or one can in other ways determine the amount of alumina which has been converted to the fibrous form. The time required can thus empirically be determined in each instance for each system by direct observation.

Based upon the results obtained with a variety of processes of the invention, the temperature and time for materials having a $\theta$ value no greater than 1 can be related empirically as follows:

$$\log \frac{X_e}{X - X_e} = \frac{a(t)}{2.303 X_e} \text{antilog}\left(\frac{-2720}{T} + 3.4\right) + \log \frac{X_e}{a - X_e}$$

where:
$t$ is the reaction time in minutes;
$a$ is the initial molar concentration of unpolymerized alumina computed as $Al_2O_3$;
$X_e$ is the unpolymerized alumina concentration when the reaction has attained equilibrium for the particular temperature conditions used, and $X$ is the unpolymerized alumina concentration at time $t$;
$T$ is the temperature of the reaction on the absolute, Kelvin, scale;
Log is the logarithm to the base 10 of the expression shown; and
Antilog is that number whose logarithm to the base 10 corresponds to the figures in brackets following this expression.

The above expression can be solved for $t$ in the following simplified form:

$$t = \frac{1}{1090}\left(10^{\frac{2720}{T}}\right)\left(\frac{X_e}{a} \log \frac{a - X_e}{X - X_e}\right)$$

where the terms are as stated above.

From the above expression one can readily determine the reaction time for a particular temperature. It will be understood that this can be varied considerably depending upon the starting material. For materials having a value for $\theta$ greater than 1 minute, longer reaction times can be used at a given temperature and this can vary from the above expression by as much as, say, 100 percent.

Using a rapidly depolymerizable alumina, temperatures as low as, say, 120° C. can be used over long periods of time to effect growth of alumina fibers. It is preferred to use a temperature above 120° C. though temperatures in excess of about 250° C. are not preferred. It is more specifically preferred to operate processes of the invention at a temperature between about 150° and 220° C.

EFFECTS UPON PRODUCTS OF VARYING PROCESS CONDITIONS

The effects of varying certain process conditions have already been described generally above. Processes of the invention will be better understood by illustrating the effect of varying certain conditions while holding other process conditions constant.

(a) Concentration of alumina

If a paradigm aqueous solution containing 2 percent $Al_2O_3$, supplied as basic aluminum chloride, and having an $Al_2O_3$: chloride ion mole ratio of 1:1 is heated at 160° C. for four hours a viscous translucent sol will be obtained.

If the concentration of alumina in the paradigm is increased, a very thixotropic but still opalescent gel will be obtained with concentrations of $Al_2O_3$ of 3 and 4 percent. As the concentration is further increased the product becomes more and more white; that is, it becomes less opalescent and more firm and compact. The specific surface area of the products obtained increases in some cases as much as 100 m.²/g. in going from 2 percent $Al_2O_3$ to 24 percent $Al_2O_3$ even though the amount of unpolymerized alumina, which indicates the extent of the reaction, stays constant.

As the concentration is raised above about 4 or 5 percent, the products become more aggregated until at a concentration of about 16 percent $Al_2O_3$ a very highly aggregated product is produced. These latter aggregates in general are not ordered aggregates or tactoids but are disordered ones. Such highly aggregated products are not the products of this invention and they cannot be dispersed.

It is, however, possible to obtain a much less highly aggregated product even at such a high alumina concentration as 25% by raising the pH to between 4.5 and 5 prior to heating. Other expedients can be used to minimize aggregation such as the addition of organic amines in amounts sufficient to give an $Al_2O_3$ to amine mole ratio between 30:1 and 500:1. Such amines can be used as n-butyl amine and 1-amino-ethanol.

If the conditions of the paradigm are modified by lowering the concentration of alumina, it is found that the products obtained are less viscous and are more translucent. Too dilute solutions cannot be used advantageously since, as noted above, fibrils are not formed below alumina concentrations of about 0.05 molar.

(b) Ratio of alumina to acid anion

If the chloride concentration of the paradigm is varied, it is found that above a ratio of 1:1 of $Al_2O_3$:Cl the product particles tend to become broader and shorter. As the ratio of alumina to chloride is increased to above the critical limit previously described a point is reached where no fibrils are formed.

Going in the opposite direction and increasing the chloride content so as to lower the ratio, the products do not become wider but they aggregate into tactoids, and as the concentration of chloride is further increased, shorter fibers form an eventually, above the upper limit of the ratio specified in the empirical equation previously given, no fibers form at all.

(c) Time and temperature

Again, taking the paradigm solution, the effect of varying temperature and time can be considered. Increasing the time of reaction over the 4 hours at 160° C. of the paradigm results in a product having a lower surface area and the fibers are more aggregated into tactoids. If a time of less than 4 hours at 160° C. is used particles are obtained with a higher surface area. For example, short particles are produced in one hour, or even in one-quarter hour, and they have a surface area of up to 400 square meters per gram. In 16 hours products having a surface area of 200 square meters per gram are obtained.

At 4 hours at 160° C. equilibrium as to disproportionation is obtained. At lower temperatures longer times are required. For example, below 120° C. several hundred hours are required. In general, as the temperature is raised above 160° C. using the paradigm conditions, the products become broader and the ratio between the length and the next smallest dimension drops below that of the fibrils obtained under the original conditions.

If the paradigm conditions are modified by raising the temperatures to above about 250° C. the effect of concentration of alumina becomes much less marked. In other words, the products obtained at these temperatures are about the same regardless of the concentration of alumina within the ranges already indicated.

FURTHER PROCESS CONSIDERATIONS

Figure 1:
Figure 1 is a pen-and-ink drawing made from a photomicrograph at 25,000 diameters' magnification of fibers of the invention made up of fibrils disposed parallel to the length of the fiber.

It is to be observed of the heating times and the temperatures used that it will in general be desired to produce fibrils two dimensions of which are in the colloidal range. Times and temperatures which lead to much larger products are not preferred. It is, nevertheless, to be understood that assemblies of fibrils will flocculate together as shown in Figure 1 of the drawing to form fibers of alumina monohydrate having the boehmite crystal lattice which are super colloidal in size and are quite desirable products of the present invention.

As above described, a fibrous alumina can be made simply by heating an aqueous dispersion of alumina in the presence of an acid radical under conditions as set out. It will be understood that during the process, the alumina is converted to the fibrous alumina monohydrate modification and is no longer polymerizable, i.e., it becomes a crystalline alumina monohydrate having the boehmite crystal lattice. This alters the ratio in the system of the dispersion of alumina to acid radical, the ratio diminishing as the reacted alumina is transformed into the aloxane-polymerized crystalline alumina in the fibers.

The system in which fibers of alumina are being formed can be replenished with respect to the alumina dispersion by the addition of an alumina material of the types above described as suitable. This addition can be continuous or can be effected batchwise. Thus, a suspension of finely divided, highly hydrated aluminum hydroxide can be fed continuously.

It will further be apparent that in beginning the formation of fibrous products according to the invention, a dispersion of fibrils which have previously been prepared can be added to the aqueous dispersion which is used at the beginning of the process. It will also be evident that such processes as those described can be conducted continuously by the steady introduction of alumina and acid into a stream of a suspension containing the fibrous alumina monohydrate and which may or may not contain some dispersed alumina.

It will be understood that dispersions containing both fibrous alumina and incompletely polymerized or depolymerized starting material can be used. The formation of fibers proceeds more rapidly and at lower temperatures in the presence of fibers of alumina monohydrate having the boehmite crystal lattice as is discussed hereafter.

The processes of the invention can be operated to obtain various ratios between the fibrous product and incompletely reacted starting materials. The process will have value so long as a sufficient amount of fibrous alumina monohydrate having the boehmite crystal lattice is produced so that the resulting dispersion can be used for some purpose or can be further treated either to separate unreacted material or convert it to fibrous material. Sometimes it will be advantageous to retain a small amount of the original starting material in the form of unpolymerized alumina which can function as a binder for the fibrous particles of alumina. Often, however, it will be desired to remove unreacted material as will be shown hereafter.

DISPOSITION OF UNREACTED ALUMINA AND ACID

The acid radical remaining in an aqueous dispersion at the end of the heating step can be removed by gelling the aqueous sol. To do this the pH is raised quickly to a value between 8 and 10. Thus the gelation can be effected at temperatures above 60° C. and by adding the aqueous sol to a base rather than the reverse. Salt resulting from the neutralization of the acid radical is removed by filtration and washing.

An alternative procedure is to gel at a higher pH, say, above 11 in which case the unpolymerized aluminum is converted to soluble aluminate and it can be washed out with the salts.

The anion free gels thus produced can be redispersed in distilled water to produce a sol which is essentially neutral—pH 7 to 8.5. The gels can be redispersed in a desired acid, including weak acids such as those having a dissociation constant lower than 0.1 at 25° C. such as acetic and formic. The pH of the final sol can range downwardly from 10 and reach values as low as, say, 1.

If the gels are to be dispersed in basic solutions care should be taken to insure that forms of alumina other than fibrous alumina and aluminum ions as $[Al(H_2O)_6^{+3}]$ are absent. Partially polymerized forms of alumina such as basic aluminum ions interfere with dispersion of an anion free gel at pH values above 8.5.

The absence of interfering forms of alumina can be insured as by continuing the heating stage in processes of the invention until the reaction is complete. This produces only alumina monohydrate and aluminum ions. The attainment of this condition can be determined by titration.

The sols can be gelled and washed as above noted and then redispersed by adding base in amounts sufficient to adjust the pH of the sol to a pH up to 10. Sodium, potassium, lithium, ammonium hydroxide, organic amines, such as triethyl amine, tetrasubstituted ammonium bases such as tetramethyl ammonium hydroxide and other bases can be used.

DISPOSITION OF UNREACTED ALUMINA

When an aqueous dispersion of an alumina starting material is heated in the presence of an acid radical as described above, some of the alumina is not converted to alumina monohydrate having the boehmite crystal lattice. This unconverted alumina plus any acid radical present can be regarded as a basic salt of aluminum. The strong acid radical will under certain conditions of time and temperature tie up a certain amount of aluminum and will prevent its conversion to the form of crystalline alumina monohydrate having the boehmite crystal lattice.

When the reaction proceeds substantially to completion the dispersion produced will, therefore, contain a less basic salt of aluminum with the strong acid radical. If the conditions under which the conversion were effected did not succeed in carrying the reaction to completion there may additionally be some unconverted starting material, or basic salt.

The aluminum salt thus remaining can be treated as with an anion-exchanger to remove some of the strong acid radical. The dispersion can then be heated and the unpolymerized alumina will be converted to the form of alumina monohydrate having the boehmite crystal lattice. Much of the alumina appears to "plate out" as a coating on the fibrous alumina monohydrate already present in the dispersion though some can form new nuclei.

The process can be repeated if there is still unpolymerized alumina present. This can be done by again withdrawing acid radical and again heating. This can be repeated until the anion content is as low as desired.

The unpolymerized alumina present as an aluminum salt in various dispersions prepared according to the invention will represent a minor amount of the total aluminum present in the system. Thus the aluminum salt can amount to about 30 percent by weight, computed as $Al_2O_3$, of the total alumina in the dispersion. Generally no more than about 20 percent of unpolymerized alumina will be present based upon the total alumina present. It will be seen that there is no lower limit since the amount of unpolymerized aluminum can successively become smaller and smaller as the process of the invention is repeated with a given sol.

QUANTITATIVE DETERMINATION OF UNPOLYMERIZED ALUMINA

In order to practice processes of this invention, it is desirable to have analytical methods for determining the types of alumina present and for determining the amount of strong acid radical. If acetic or formic acids are present one should, as noted later, take them into account.

By the term "unpolymerized alumina" is meant alumina in any form other than a crystalline form of alumina such as gibbsite, boehmite or bayerite. In general, the soluble alumina consists of amorphous aluminum hydroxide, basic aluminum ions, and normal aluminum ions. The quantitative determination of all forms of unpolymerized alumina can be carried out in the presence of a crystalline form of alumina such as boehmite.

For sols having a specific surface area of less than about 350 m²/g. the best procedure is to add an amount of 1 N HCl equivalent to 1½ times the soluble alumina expected. For autoclaved basic aluminum chloride solutions (with $Al_2O_3$:Cl 1:1 and about 2 percent $Al_2O_3$) this varies from about 15–30 percent of the total alumina. This mixture is then diluted to twice the volume of the acid originally used, allowed to stand 30 minutes in order to age the sample in 0.5 N HCl, diluted to 100 milliliters, and titrated rapidly in small increments with 0.5 N sodium hydroxide to pH 11. When the titration data are plotted, the amount of 0.5 N NaOH added as the abscissa and pH as the ordinate, a titration curve is obtained. The amount of NaOH required between the inflection points in the curve at pH of 3–4 and 7–8 is related to the amount of unpolymerized alumina present. Under these conditions, it has been shown that the fibrous alumina monohydrate having the boehmite crystal lattice is not significantly attacked by the acid.

To obtain the percent unpolymerized alumina, the amount of base required for the above titration from the end point corresponding to the titration of excess acid (pH 3–4) to that corresponding to the titration of aluminum hydroxide (pH 7–8) (converted to an equivalent amount of alumina, $Al_8O_9$) is determined by gravimetric analysis and multiplied by 100.

The amount of sample is chosen such that the total acidity of the sample plus the acid added is equivalent to 20–25 milliliters of 0.5 N sodium hydroxide. For example, with a sample containing gibbsite or high surface area boehmite greater than about 350 m.²/g., the crystalline alumina may dissolve to a significant extent upon standing 30 minutes in excess acid. In this case, the second sample should be run exactly as above, except that the acid-sol mixture should stand several hours before dilution and titration with base. The percent soluble aluminum may be calculated for each run and extrapolated to 0 time, provided the rate of solution is less than 5 percent of the total alumina per hour.

If the rate of solution is greater than 5 percent per hour, the above procedure cannot be used to determine accurately the unpolymerized alumina in the presence of crystalline alumina. In such cases, the best characterization would be the acid depolymerization rate θ described hereafter in connection with characterization of products of the invention.

DETERMINATION OF STRONG ACID RADICAL IN SOLS OF ALUMINA MONOHYDRATE

The amount of sample and the exact conditions most satisfactory for the titration of a sample with standard base will vary with the concentration of acid radical. For example, using solutions or sols containing an $Al_2O_3$:Cl ratio of 1:1, a convenient size of sample is one containing about 0.3 gram of alumina. This is diluted to 100 milliliters and titrated with 0.5 N sodium hydroxide requiring about 6 milliliters to reach an inflection point (about pH 7–8). For more accurate determination one may use a more dilute standard base. The rate of addition of base should be constant at about 1 milliliter per 1½–3 minutes, being fast enough to avoid the formation of polymeric basic aluminum ions during the titration. The presence of the higher polymeric cations $$[Al(OH)_2]_x \text{ or } [Al_2(OH)_5]_y$$

in the initial sol would be indicated by an inflection at a pH of 5.5. In the above expressions $x$ and $y$ indicate positive integers greater than 1 which depend on the molecular weight of the particular polymeric cation, that is, the number of repeating units in each polymer structure.

INCREASE OF BASICITY

The first step in processes for disposing of unreacted alumina, as noted above, is the removal of the strong acid radical from the fibrous boehmite dispersions above described. This is preferably effected by the use of an anion-exchanger, or by gelation and washing as described above.

The strong acid radical can be removed by dialysis. Unfortunately not only the acid radical but aluminum and basic aluminum ions are also removed. When these are removed a basic aluminum chloride of high basicity can be added back in an appropriate amount and the dispersion heated according to processes of the invention.

The strong acid radical can be removed by chemical precipitation as an insoluble salt of a metal added in the form of a base or bicarbonate. For example, the chloride ion can be removed by treatment with silver oxide.

Various anion-exchangers, such as those mentioned below, can be used for removing the strong acid radical. The anion-exchangers can be used in partially exhausted form, or suitably buffered, so that the pH is less than 6.

It is preferred to remove the strong acid radical using the bicarbonate form of a strong-base type anion-exchanger containing quaternary ammonium groups as shown in Dalton U.S. Patent 2,733,205. The anion-exchanger can be any of those known in the art. Suitable anion-exchangers are mentioned, for instnace, in the patent cited in Dalton 2,733,205.

The removal of the strong acid radical may be carried as far as possible. In other words, all of the radical may be taken from the dispersion which can be removed using the anion-exchanger. Based on the unpolymerized alumina present it is preferred to remove the strong acid radical to an $Al_2O_3$:acid radical (mol) ratio of greater than about 1:1. Actually the removal will ordinarily go to much higher ratios, say, above 100:1.

TIME AND TEMPERATURE OF HEATING TO DISPOSE OF UNREACTED ALUMINA IN THE PRESENCE OF FIBROUS ALUMINA MONOHYDRATE HAVING THE BOEHMITE CRYSTAL LATTICE

Dispersions of fibrous alumina monohydrate having the boehmite crystal lattice from which the strong acid radical has been at least partly removed, as above described, are then heated. The heating converts unpolymerized alumina present in the system to alumina monohydrate having the boehmite crystal lattice.

It is interesting that lower temperatures can be used to effect the conversion of alumina to the fibrous alumina in sols of fibrous alumina monohydrate prepared as above than when aqueous dispersions of alumina containing little or no such fibrous alumina are heated. Ordinarily, a temperature of at least 80° C. should be used. A temperature of 100° C. is entirely practical. Higher temperatures may be used up to, say, 375° C., but it is generally preferred to use temperatures no higher than about 280° C.

The time required at any given temperature to convert the unreacted alumina to boehmite depends upon the amount of unreacted alumina present. About three hours is required at 100° C. with a sol containing 12 percent of unreacted alumina and having an $Al_2O_3$:Cl ratio of 120:1.

Higher temperatures allow the use of shorter reaction periods.

The products produced by processes as just described are aqueous dispersions of fibrous alumina monohydrate having the boehmite crystal lattice. These are low in forms of alumina other than such alumina monohydrate and are low in acid radicals. By repeated anion-exchange and heating cycles the products can be made substantially free of both acid radicals and forms of alumina other than such alumina monohydrate.

The dispersions produced according to the procedure just described are stable at higher pH's than dispersions which contain an unpolymerized aluminum salt. They are also more compatible with organic solvents and resin dispersions. These properties increase the range of usefulness of the products.

Products of this invention can be produced by processes other than those of this invention as above described. They can be produced by heating a basic aluminum carbonate gel in the presence of dilute acetic or formic acid under autogeneous pressures as described in detail in the copending application, Serial No. 730,024, filed April 21, 1958.

Briefly the process consists of first preparing a very pure basic aluminum carbonate by precipitation from alum $[Al_2(SO_4)_3.18H_2O]$ and a water-soluble carbonate. The mole ratio of $CO_3$:Al is 1.5:1 to 1.90:1. The gel is washed to great purity so that the $SO_4$:Al mole ratio is less than 0.01:1 and the cation:Al ratio is less than 0.04:1. The resulting basic aluminum carbonate gel is heated to 140° to 180° C. in an autoclave to give an aqueous sol of fibrous alumina monohydrate. The product as thus produced is a product of the present invention though the process is not here claimed.

PRODUCTS OF THE INVENTION

Products of the invention have already been described generally above. But a further description of characteristic properties will be useful. The most sginificant properties are:

(1) Particle size and shape,
(2) Surface area,
(3) Streaming birefringence,
(4) X-ray diffraction pattern,
(5) Electron diffraction pattern,
(6) Infrared absorption spectra.

Each of the characteristics above tabulated will be discussed briefly. All of the techniques used are well accepted for the identification of other materials. The description below is directed primarily to adapting such well-known techniques to the characterization of the fibrous products of the invention.

(1) Particle size and shape

Process conditions, such as times and temperatures, are preferred which lead to fibrils two dimensions of which are in the colloidal range. Conditions which lead to much larger products are not preferred. It is, nevertheless, to be understood that assemblies of fibrils will flocculate together as shown in Figure 1 of the drawing to form fibers which are super colloidal in size and are quite desirable products of the present invention. The shape of particles in aqua sols of the invention can be determined by diluting to about 0.1% $Al_2O_3$, or preferably lower, with water, drying, and examining the dried material with the electron microscope.

Figure 2:
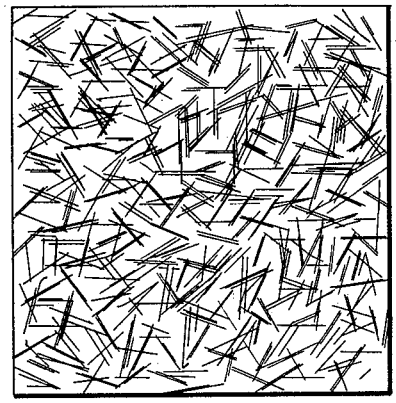
Figure 2 is a similar showing of a product in which the fibrils are relatively non-aggregated and are not oriented.

Depending upon the time and temperature of heating and upon the ratio of alumina to acid radical, the products obtained will be in the form of small fibrils, at least two of the dimensions of which are in the colloidal range, such as shown in Figure 2, or the products will be in the form of aggregates or bundles such as that shown in Figure 1. The products of Figure 1 result when the particle charge is such as to allow some agglomeration and aggregation of the fibrils to form fibers in which the particles are disposed in parallel relationship along the axis of the length of the fiber.

Referring more particularly to Figure 2, there will be seen the many small fibrils which are evident upon examining an aqueous dispersion prepared according to processes of the invention. This is a showing typical of those obtained using an electron microscope at a magnification of about 25,000 diameters. The fibrils as shown can occur in the products in a random arrangement as illustrated although they usually do not occur as single fibrils but rather in groups of two, three, or even many more. Such groups form colloidal fibers.

It is to be noted that the products produced are distinguished from rods in that, generally, the axial ratio is at least about 20:1. In other words, the ratio of the length of the fiber to the width as observed on the electron micrograph, or as determined by nitrogen absorption, is at least about 20:1. While the observed width of fibrils and the diameter as determined by nitrogen absorption are about the same for some products of the invention, most are lath-like so that the two smallest dimensions are different from one another. It is perhaps better to note that the axial ratio is the ratio of the length of the fibril to the next smaller dimension here called "width," or "breadth." The smallest dimension is called "thickness."

It is to be noted that although the ultimate fibrils of products of the invention are believed upon the basis of present experimental evidence to have a rectangular cross-section, they will be considered as having a circular cross-section and thus the ratio of length to apparent width will be considered as a ratio of length to equivalent diameter.

One can compute the equivalent diameter of particles in products of the invention from their specific surface area as determined by nitrogen absorption. The relationship is as follows:

$$d=\frac{1330}{A}$$

where:

$d$ is equivalent diameter in millimicrons. Equivalent diameter is the diameter of a right-circular cylinder which has the same specific surface area.
$A$ is specific surface area in m.$^2$/g.

Preferably, the ratio is at least about 20:1. It is more specifically preferred that the axial ratio be about 50:1 to 150:1. The axial ratio can be as high as 300:1.

It will be observed that in the above discussion and throughout the application the term "fibril" is used in its customary sense to refer to products which under the electron micrograph appear to be unitary as opposed to structures formed of aggregates of a number of separate members. The term "fiber" is used in accordance with customary meaning to include both fibrils and aggregates of fibrils which form relatively long thread-like structures. The term "fibrous" is also used generically to refer to products which are composed of fibers which will embrace products in which the fibrils are discrete and relatively unaggregated.

It is to be noted further of the products like those of Figure 2 that at least two of the dimensions of the fibrils are in the colloidal range. Ordinarily the breadth and thickness will be of the same order of magnitude and these will be less than about 15 millimicrons but not much less than about 3 millimicrons. It is more specifically preferred that they be from about 3 to 10 millimicrons. Still more specifically it will usually be preferred to prepare particles which have a considerably smaller diameter, around 4 to 7.

It will be understood that in stating the range of diameters, reference is made to the diameter of particles in different products. The particles in a particular product will have a diameter as described which is a figure within the range stated. One of the characteristics of products of the invention is that the diameter of the particles of a given product is surprisingly constant from particle to particle and each particle is of substantially uniform diameter throughout its length. Even though particles may differ greatly in length, the diameter of various particles will be relatively constant in a given product prepared according to the invention. Specific preferred type of products will be described hereafter.

Fibrils observed in electron micrograph fields are examined as to length, number, and other characteristics, and, based upon experience, it is assumed that they are typical of the fibrils present in the entire sample being examined including fibrils in the aggregates. It is probable that the longest fibrils in a given sample have the greatest tendency to form fibers by aggregation, but it is thought that the error thus introduced in the above method of measurement is relatively small.

The length of fibrils of products of the invention will generally be as indicated from the ratios above given. More specifically, the products of the invention are made up of fibrils having a length from 100 to 1,500 millimicrons. Preferred products will have a fibril length of about 100 to 700 millimicrons.

The redispersible, pulverulent products of the invention which have been dried from aqueous systems tend to have shorter fibrils and slightly lower surface area than the sols from which they were made. Thus such products may have a fibril length of 25 up to 1,500 millimicrons. Preferred pulverulent products have a length from 50 to 700 millimicrons. The surface area and other characteristics of such pulverulent products fall within the limits set out herein. Using the formula $$d=\frac{1330}{A}$$

above, it will be seen that at a surface area of 200 m.$^2$/g. such products have a diameter of 6.65 millimicrons and, at a length of 25 millimicrons, an axial ratio of 3.76:1. At a surface area of 400 m.$^2$/g., the axial ratio of products with a length of 25 millimicrons is 7.5:1.

In speaking of particle size and shape it will be understood that reference is to the average fibril particle. Thus reference will be to average width of all particles, etc. If, for example, it is said that the particles of a particular product are 5 millimicrons in diameter it is meant that the sum of the diameters of observed particles divided by the number of particles, all expressed in millimicrons, equals 5. The same diameter figure can of course be reached by observing the average length of fibrils in the product, and deriving diameter from a computation based upon nitrogen absorption. The individual fibrils will mostly be of about the same dimensions in products of the invention for they are surprisingly uniform.

As has been noted above, there is considerable difficulty when making an electron micrograph in obtaining a representative area for examination. When samples are studied by drying a large droplet and examining the entire field, not all areas of that field will be the same and there is an element of judgment as to which constitute typical and appropriate areas and which represent areas of artificially induced aggregation. Accordingly it will often be preferred when highly accurate results are desired to use a spray-mist technique which will be described below. This differs from the "field technique" heretofore described in that instead of examining a large area and taking selected portions of it the sol sample is sprayed as a fine mist and entire individual droplets can be examined. In this way the droplets represent the entire composition of the sol and an accurate count of particles, lengths, and diameters can be obtained. That is to say, every fiber in a droplet can be counted and measured and a true number average obtained which is representative of the sol as a whole.

For the most part the field technique has been used in the examples and specification and where the spray-mist technique was used it is specifically identified. The limits of the invention can be determined using either technique, but the spray-mist technique is preferred.

a. Preparation of the sample

The microscope sample grids are prepared in the normal way, such, for example, as described in "Introduction to Electron Microscopy," by C. E. Hall (McGraw-Hill Book Co., 1953), on page 312 ff.

A representative sample of the dispersion is, of course, required for the measurement. This is not necessarily obtainable by evaporation of a macrodroplet on the grid since only a small fraction of the total sample can be viewed. If the droplet is made small enough, however, all the particles can be seen in a single micrograph, and a representative fraction of them can be measured.

Droplets which on drying leave circular patterns of 20 microns or less are readily produced by means of a commercial nebulizer. The colloidal dispersion is diluted to 0.01–0.05 percent solids, introduced into the nebulizer, and holding the discharge end about one inch from the microscope sample grid, a stream of the droplets is directed toward the grid by squeezing the rubber bulb two or three times. Since droplets of this size evaporate almost immediately, the grid may be inserted directly into the microscope. A more complete discussion of this technique may be found in the "Introduction to Electron Microscopy," by Hall on pp. 370–389, and in an article by R. C. Backus and R. C. Williams in the Journal of Applied Physics, vol. 21, p. 11, 1950.

b. Determination of magnification

The accuracy of the measurement depends on the accuracy of which the magnification is known. The usual method for this determination is to include an internal standard such as polystyrene latex. This can be added directly to the sample to be sprayed but it is more economical to add it to the grid before spraying. Comparison of the diameter of the polystyrene particles with the spacings on a standard diffraction grating has shown the particles used have a diameter of 280 millimicrons.

c. Measurement of fiber length

Micrographs are taken such that an entire droplet can be seen in a single exposure. This requires a magnification of about 2000–3000 diameters, depending on the size of the droplet. Generally a droplet will contain several thousand individual particles. For this reason, a representative pie-shaped segment of the droplet is selected for counting, all of the particles in the segment being measured. Although the more particles that are counted the more accurate will be the result, a count of 500 particles or so should give a sufficiently accurate average particle length for most purposes.

The microscope transparency may be projected onto a large piece of paper and the particles measured thereon by means of a rule graduated in millimeters, each fiber being marked in some way as it is measured in order to prevent omission or double counting. A preferable method, however, is to prepare first an enlarged print of the micrograph having a high degree of contrast. An 8½ x 11 inch size using "Varigam" paper and a No. 8, 9 or 10 Varigam filter is quite satisfactory. Magnification under these conditions is about 10,000–15,000 diameters. Although the lengths of the individual fibers can be measured directly with a millimeter rule, it is frequently difficult to distinguish individual fibers when they are closely aligned as in aggregates. A more satisfactory method is to use a low-power binocular microscope, e.g., 7–10 power. The individual fibers in most aggregates can thus be recognized and measured. It is convenient to use two rules (graduated in millimeters or preferably half millimeters) fastened together at right angles, and to mark each measured particle by means of a wax, or glass-marking pencil. In cases in which adjacent fibers cross each other at very acute angles or contact each other at or near the ends of the fibers considerable care must be taken in the identification of both ends of each individual fiber.

From the data obtained, the number average fiber length in millimeters is calculated, from which the true fiber length in millimicrons is obtained by comparison with the average diameter of the polystyrene latex particles. Thus:

Fiber length in millimicrons $$= \frac{\text{average length in millimeters} \times 280}{\text{average diameter of latex particle in millimeters}}$$

(2) Surface area

The particle size and shape is further defined by the specific surface area. Especially with fibrils which are very small, the measurement of sizes from an electron micrograph becomes quite difficult. The use of specific surface area can add considerable information concerning the character of the fibril.

In a product made up of fibrils of high axial ratio, the specific surface area is almost independent of the length of the fibrils. This is true because the surface area of the ends of the fibrils is only a small fraction of the total available surface. Thus, if the fibril is regarded as a small cylinder, it will be seen from geometric considerations that the percentage of the total surface contributed by the ends is given by the expression:

$$\frac{100}{(2L+1)}$$

where L is the ratio of the length of the fiber to its width or thickness.

The fibrils in products of the invention having axial ratios greater than 20:1, the contribution to the surface area by the ends of the fibrils is at the most 2.5 percent and is usually less than 1 percent of the total surface.

Measurement of the specific surface area of products of the invention therefore provides an accurate and sensitive method for ascertaining the smaller two dimensions of the particles. These will, of course, be determined as the equivalent fibril diameter. The length of the fibrils can be determined from electron micrograph measurements or from measurements of streaming birefringence and this information can be combined with the information on width as determined by surface area, assuming a density of 3.01 for the alumina, to give an accurate measure of the axial ratio of the fibrils in a product of the invention.

The specific surface area of the fibrils in sols or dispersions produced according to the invention can be determined by drying the dispersed alumina from an organic liquid medium. Thus, as described below in more detail, normal butanol or another partially water miscible liquid can be added to the water dispersion and a water-butanol azeotrope removed until the system is anhydrous. The partially water miscible liquid is then removed to leave a very fluffy dry product. In the case of products of high specific surface area, say, around 400 m.$^2$/g., it is preferred to remove the organic liquid by heating to above the critical point and then removing the vapors. The original structure is thereby relatively undisturbed giving a minimum of aggregation of the ultimate fibrils.

The specific surface area of the dried alumina is determined by drying the colloidal alumina monohydrate fibrils from an organic liquid medium in such a way as to prevent loss of area through aggregation of the fibrils as just described. The specific surface area of the dried alumina is determined according to the method of P. H. Emmett, "A New Method for Measuring the Surface Area of Finely Divided Materials and for Determining the Size of Particles," Symposium on New Methods for Particle Size Determination in the Sub-Sieve Range, p. 95, published by the American Society for Testing Materials, March 4, 1941.

In products prepared by the azeotropic removal of water from fibrous alumina sols as above described, the specific surface area of the fibers as determined by nitrogen absorption will correspond to that as determined by examining the product with an electron microscope, then measuring the fibril dimensions, and calculating the specific surface area based on the density of crystalline alumina monohydrate, 3.01 grams per cubic centimeter.

The products of this invention in general have specific surface areas ranging from around 200 to 400 m.$^2$/g. The products having a specific surface area between about 250 and 350 m.$^2$/g. are preferred.

The degree to which the purified colloidal alumina solution can be concentrated without becoming excessively viscous depends upon the specific surface area of the colloidal particles. Thus, a purified colloidal solution of alumina monohydrate from which most of the free ions have been removed and in which the particles have a specific surface area of around 200 m.$^2$/g. can be concentrated to give a stable, fluid sol containing 15 percent $Al_2O_3$. In the case of products of the invention having a specific surface area of around 400 m.$^2$/g., the concentration of alumina can be increased to about 10 percent $Al_2O_3$, after removal of most of the anions, without the solution becoming so viscous that it will not pour.

The fibrous particles in alumina products of the invention are extremely stable as to their shape and crystalline form. Unlike prior alumina sols and particles they can be heated in water to temperatures as high as 100° C. for prolonged periods, say up to a day or more, without change of shape or crystalline form.

(3) *Streaming birefringence*

Suspensions and sols of fibrous alumina prepared according to the invention have the property of streaming birefringence.

Streaming birefringence is a property of anisometric particles, that is, particles which have one dimension which is considerably greater than another dimension or both other dimensions. Streaming birefringence is thus an empirical method of expressing shape and determining size.

The quantitative measurement of the length of the particles, the distribution of particle sizes, the axial ratios, when small, and the intrinsic birefringence of the particles can be effected by means described in the literature. Cerf and Scheraga, Chem. Reviews 51, 185–261 (1952); Edsall, Rich, and Goldstein, Rev. Sci. Inst. 23, 695 (1952); Edsall, "Advances in Colloid Science," (1942), vol 1, page 269; Joly (Trans. Faraday Soc. 48, 279–286 (1952); Barbu and Joly (Discussions of the Faraday Soc. No. 13, 77–93 (1953)); A. Peterlin, "Rheology," Ed., F. R. Eirich, Academic Press Inc., N.Y., vol. 1, 1956 (p. 615).

There are four foundamental quantities which can be determined from streaming birefringence data:

(1) $L_f$ is the most frequently occurring particle length in microns.

(2) P, polydispersity, is the area under the particle size distribution curve of the particles in the system. By this it is meant that in a graph made by plotting on one axis, the length of the particles in the system and on the other axis the number of particles having this length, a curve can be obtained which represents the distribution of particle sizes in the system. The area under the curve is called the polydispersity and it represents the narrowness or breadth of the distribution of particle sizes in the system.

(3) $\overline{\Pi}$ is a measure of the breadth or narrowness of the particle size distribution per unit length of the particle. If the area under the particle size distribution curve P is divided by the most frequently occurring particle length in the system, $L_f$, $\overline{\Pi}$ is obtained.

(4) $\overline{A}$, mean optical intrinsic anisotropy, is a measure of the combined contributions of streaming and intrinsic birefringence. On systems containing fibrils of alumina produced according to the invention, $\overline{A}$ gives information on the state of aggregation and perfection of the particles.

In preparing a sample for a quantitative study of streaming birefringence, the following experimental procedure is convenient and has been followed in characterizing the products of this invention.

The sample is diluted to a concentration such that it contains 0.05 percent of $Al_2O_3$. The pH of the diluted sol is then adjusted to 2.0 with hydrochloric acid and the sol is agitated in a Waring Blendor for a period of 10 minutes. After this, it is put into the streaming birefringence apparatus taking care to insure freedom from dust and from air bubbles. The streaming birefringence is then determined over the gradient range of from 10–7000 reciprocal seconds. The instrument and apparatus used are similar to those described in the Edsall, Rich and Goldstein reference, previously cited 23, 695 (1952). The above reference can be consulted for any additional information with reference to the technique for the determination of the streaming birefringence of the sol.

The determination of particle length by streaming birefringence will agree closely with the determination by electron micrograph only if a particular sol is but little aggregated and does not aggregate during the streaming birefringence measurement. Ordinarily the measurement of streaming birefringence itself causes alignment and aggregation of fibrils so that the length $L_f$ of fiber as determined will ordinarily be larger than that calculated from the electron micrograph. The sols of the invention are characterized by having an uncorrected value for $L_f$ which is between 200 and 2,000 millimicrons. The preferred sols of the invention usually have a value of $L_f$ between 300 and 800. For preferred products of the invention the value of $\overline{A}$ is in excess of $3 \times 10^{-2}$.

The product characteristics above described are to a considerable extent a function of each other thus specific surface area, length of fibril, fibril diameter, and axial ratio are obviously interdependent. Therefore products of the invention can be characterized as to their size and shape by defining only the specific surface area and length of the fibrils.

(4) *X-Ray diffraction pattern*

The fibrous alumina monohydrate products of the invention have the characteristic X-ray diffraction pattern of boehmite. This is shown in the ASTM diffraction data card 2–0129.

In obtaining X-ray diffraction patterns on the products of this invention, the samples were first dried by air drying, by azeotropic dehydration and venting from organic solvents, or by freeze drying. They were then mounted in aluminum sample holders ¾" long and ⅜" wide. They were exposed to copper, K$\alpha$ radiation of wave length 1.54 Angstrom units which had been filtered through a nickel filter.

The X-ray diffraction patterns were determined on a North American Phillips Company wide range goniometer. Detection of diffracted ratiation was accomplished by means of a Geiger tube connected to a Brown recorder. The intensity of the lines was obtained against a standard boehmite sample, and all products were referred to the same standard. The line broadening of the products of this invention was determined by a measurement of the width of the lines at one-half the peak intensity.

In examining the X-ray diffraction pattern of products of the invention there will be found line positions and line intensities somewhat unlike the ASTM diffraction data card above mentioned. This is to be expected since the products are synthetic and, though of the same crystal structure as the alumina of boehmite found in nature, there are differences in impurities and possibly in precise arrangement of crystal lattice. In any event, however, one skilled in the examination of X-ray diffraction patterns would conclude from the X-ray diffraction pattern of products of the invention that they, like synthetic boehmites previously produced, are of the same crystal structure as the alumina represented by ASTM diffraction data card 2-0129.

In addition to displaying the characteristic lines and approximate intensities of the ASTM data card for boehmite, products of the invention are also characterized by the ratio of the peak intensity of the X-ray diffraction line from the 020 crystal lattice plane compared to the intensity of this line in a sample of boehmite having a surface area of less than 10 m.$^2$/g. It is preferred that this ratio of the peak intensities of the 020 crystal lattice plane be less than 40:100.

Products produced according to the invention are surprisingly stable for their extremely small particle size. The alumina monohydrate fraction of reaction mixtures produced according to the invention does not have the tendency to change to other crystalline forms as do the synthetic boehmite particles heretofore known, for example, certain gels precipitated from aluminum salt mixtures.

(5) Electron diffraction pattern

The electron diffraction spectrum of fibrous alumina monohydrate placed on the electron diffraction screen from a dilute dispersion is considerably different from that of a randomly aggregated boehmite. For example, the three strongest lines of boehmite in the X-ray diffraction pattern are missing, or greatly reduced in intensity, in the electron diffraction pattern. These spacings correspond to 6.1 A., 3.17 A. and 2.34 A. On the other hand, the characteristic feature of the electron diffraction pattern is the unusually high intensity of the diffraction pattern at 1.86 A., 1.43 A. and 1.13 A., and 0.934 A.

However, lines which are missing in the electron diffraction spectrum as determined above, can be observed as fiber arcs if the specimen screen is tilted with respect to the electron beam. The missing lines of boehmite in that case show up as characteristic arcs typical of fiber diagrams.

(6) Infrared absorption spectra

Figure 5:
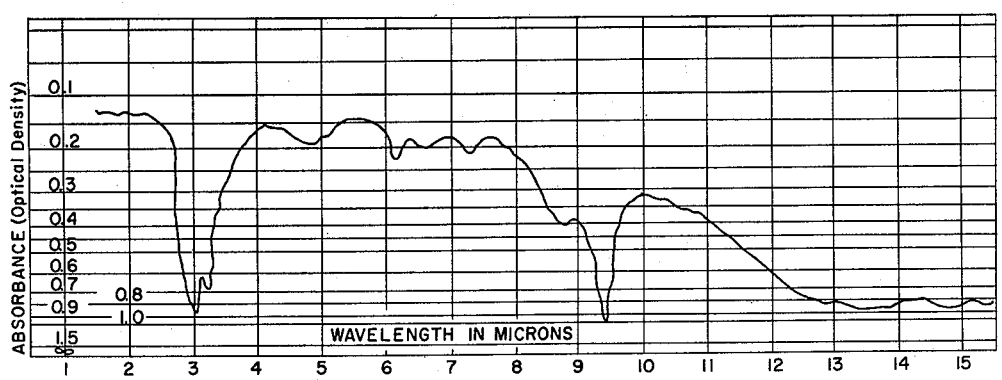
Figure 5 is a representation of the infrared spectra of products of the invention.

Products of the invention can further be characterized by means of their infrared absorption spectra. A typical spectrum is shown in Figure 5. As at least one and usually two of the dimensions of the ultimate fibrils of products of the invention lie in the colloidal range, they do not scatter light in the infrared region.

Prior to determining the infrared spectrum of the products of this invention and in order to avoid the difficulties of working with solvents which have an infrared spectrum of their own, it is usually preferred to dry the products. This may be done either by the technique previously described of azeotropic dehydration, reaction with a suitable solvent such as normal butanol, and venting to give a fluffy, dry dispersible product; or by the technique of freeze drying which is well known in the art.

The dry, fluffy product obtained by either of these techniques is then mixed with optical grade potassium bromide powder.

The potassium bromide powder is prepared by first grinding the salt in a motor-driven mortar until it is thoroughly powdered. The potassium bromide is then screened through a 230 mesh stainless steel cloth and dried at 135° C. for 48 hours at atmospheric pressure.

The samples and the potassium bromide powder are then blended in a vibrator as suggested by Schiedt, Z. Naturforsch, 8B, 66 (1953).

After blending, the mixture is placed in a cylindrically ground divided casing die of the type described by Schiedt and is pressed, using a hydraulic press of 10 tons' capacity, into 12 millimeter diameter discs, in thicknesses varying from 5/10 to 2 millimeters depending on the weight of potassium bromide mixture used.

The exact thickness of these discs is determined using a micrometer, and from the measured thickness and the weight of sample introduced, the concentration in grams per millimeter of disc thickness can be computed. These discs are then scanned on a Perkin-Elmer model 21 infrared spectrophotometer.

This technique gives optically clear wafers of potassium bromide containing the particles of fibrous alumina monohydrate having the boehmite crystal lattice evenly dispersed throughout.

Since potassium bromide is virtually non-absorbing in the infrared region of the spectrum, the absorption of the infrared radiation observed with such wafers is attributable entirely to that of the fibrous alumina particles. The use of a potassium bromide disc technique has been described by J. J. Kirkland, Analytical Chemistry, vol. 27, page 1537, October 1955.

The following is a list of the principal infrared absorption bands for fibrous alumina monohydrate products of the invention. The numbers shown are the approximate location of the centers of the bands in microns:

| | |
|---|---|
| 3.05 | 8.70 |
| 3.25 | 9.41 |
| 4.80 | 13.2 |
| 5.08 | |

It is further to be noted of products of the invention that the ratio of the optical density, or absorbance, of the infrared absorption band at 3.05 microns relative to the optical density of the band at 3.25 microns is broadly greater than 1.2:1. More narrowly the ratio will vary from 1.2:1 to 1.8:1. It is noted of samples for determination of the ratio that they should be prepared as above described and equilibrated with the atmosphere under room temperature conditions, 30° C., 50% relative humidity, for 24 hours, prior to blending with potassium bromide.

RATE OF SOLUTION IN ACID

It is observed that fibrous alumina products of the invention display a considerable resistance to acid attack and for this reason they can often be advantageously used under conditions where known forms of alumina and other known fibrous materials will be unsuitable.

The stability of the products to acid attack is greater than that of the preferred starting materials and it is also greater than that of alumina precipitates prepared in the prior art at temperatures below boiling.

The stability of fibrous alumina products of the invention can be examined by considering the rate at which the product dissolves in strong acid. The rate is expressed as the time in minutes, $\theta$, required to dissolve half of the product in acid, the measurements being made according to techniques described above.

While the experimental technique for the determination of the value of $\theta$ for the products of this invention is the same as that previously described for the determination of this quantity for the starting materials, the interpretation of the results obtained is usually somewhat more complicated. When weak acids such as acetic or formic are present in the product the amount of such acids should be determined separately prior to application of the method described below. Titration as described below for aluminum ion can then be corrected for the amount of acetic or formic acid present in the product.

Depending upon the conditions of temperature and time adopted during the autoclaving step, the sols of this invention will comprise various amounts of alumina in three states of polymerization. There will usually be some unpolymerized alumina, some partially polymerized "nuclei," and of course, the fully polymerized product. Owing to the heterogeneous character of the sol, a complex plot similar to that shown in Figure 6 will be obtained when the percent of unpolymerized alumina, expressed as aluminum for convenience, is plotted against time.

Figure 6:
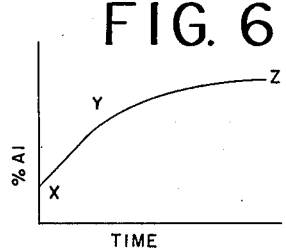

Three factors should be noted about the plot shown in Figure 6. These are: (1) The intercept at zero time, point X, on the percent aluminum axis is not equal to zero; (2) the lines are not perfectly straight; (3) there appear to be two approximately straight line portions, a rapidly rising portion X, Y for periods of time near the beginning of the depolymerization reaction, and a more slowly rising portion, Y, Z for periods of time considerably after the inception of depolymerization.

Figure 7:
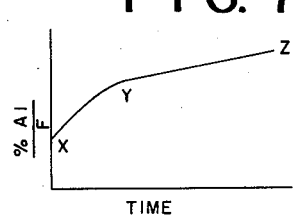

The curved nature of this plot results from the fact that the dissolution of colloidal particle is a surface reaction. A correction must therefore be applied to the percent of alumina dissolved which will compensate for the apparent slowing down of the reaction as the particle dissolves, and the available surface for reaction gradually decreases. It can be shown from theoretical considerations that in the case of fibers this correction is given by the expression:

$$F = (100 - \text{percent dissolved})^{1/2}$$

where F is the fraction of the initial surface area remaining at the time that the dissolved alumina was determined by titration. Figure 7 illustrates the application of this correction, and in this figure the percent of alumina has been divided by F. It will be noted that the lines are now essentially straight.

As mentioned above, various amounts of unpolymerized alumina may remain at the completion of the autoclaving step. It is for this reason that the percent alumina dissolved does not equal zero at zero time. That is, the unpolymerized alumina present at the beginning of the titration will immediately show up as such even before any of the polymerized product has depolymerized.

This unpolymerized alumina will usually closely correspond to that which would be determined by the unpolymerized alumina titration previously discussed, although in some instances minor differences may result which are believed to arise from the different temperature and conditions of acidity adopted in the two determinations. In any event, and by either method, alumina in an essentially unpolymerized form will be determined at the outset of the depolymerization reaction.

Figure 8:
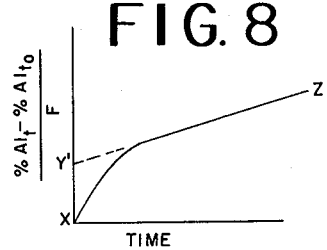
Figure 9:
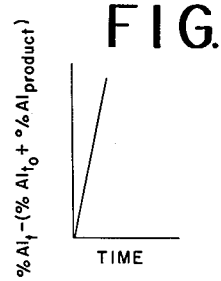

If this alumina is subtracted from that determined at all other times, a plot similar to that shown in Figure 8 will result. It can be seen that this now consists of two clearly defined portions of a line going through the origin.

The more rapidly rising portion X, Y which occurs near the beginning of the reaction is thought to be due to the depolymerization of small nuclei. The less rapidly rising straight line portion Y, Z which occurs later during the reaction represents the depolymerization of the fibrous alumina monohydrate products of the invention.

If the rate of depolymerization of the products is obtained from this Y, Z portion of the plot, the initial rapidly rising portion X, Y may be corrected for that alumina which came from the depolymerization of the fibrous alumina monohydrate product during this part of the reaction. If this is then subtracted from the total alumina determined, a plot such as Figure 9 will result, and this represents the depolymerization rate of the fibrous alumina monohydrate nuclei.

The amount of these nuclei is determined from the intercept of the product depolymerization line on the percent depolymerized alumina axis, point Y' in Figure 8.

Figure 10:
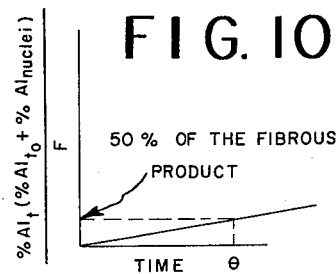

The plot of Figure 10 is obtained by correcting its slope for the depolymerization of the nuclei and is characteristic of the products of this invention. It is from plots such as Figure 10 that the values of $\theta$ for the products are derived.

The value of $\theta$ derived as above described will run above that of the preferred starting materials and will usually run above 10 and preferably will exceed 50. Ordinarily the value will not exceed about 400 minutes. The value of $\theta$ for specific products will be given hereafter.

The products of the invention are essentially AlOOH in the form of fibrous alumina monohydrate. As above described in connection with the "alumina" in the aqueous dispersions used, so with the products also it will be understood that where used the term "alumina" signifies the $Al_2O_3$ content.

ORGANIC-FIBROUS ALUMINA MONOHYDRATE SYSTEMS

The aqueous suspensions of the invention, either before or after concentration, can be transferred to organic systems. They can, for example, be transferred to aliphatic alcohols such as methyl, ethyl, propyl, butyl, and isopropyl alcohols. Often it is advantageous to raise the pH of aqueous dispersions of alumina before transfer to an organic system. Thus the pH may be raised to values of about 5 or above by the use of ammonium hydroxide or another base. In one group of preferred products the pH can be raised by treatment with an anion exchange resin.

The products can also be dispersed in methyl ethyl ketone, acetone, acetonitrile, butyl acetate, and any other organic solvent or liquid which is at least partially water miscible.

The products after the addition of a liquid which is at least partly water-miscible can be dried by the azeotropic removal of water. For example, butanol or another partially water miscible liquid can be added to the water dispersion and a water-butanol azeotrope distilled until the system is anhydrous. The partially water-miscible liquid is then removed to leave a very fluffy dry product. In the case of products of high specific surface area, it is preferred to remove the organic liquid by heating it to above the critical point and then removing the vapors. Similarly there can be used isopropanol, methanol, ethanol, methylethylketone, methyl isobutyl ketone, toluene, and mixed systems such as ethanol-benzene and any of the numerous other favorable azeotropes used for forming binary or tertiary azeotropic mixtures.

Azeotropic distillation of fibrous boehmite sols produced according to the invention can additionally be used as a method of effecting purification. Thus such a sol can be transferred to an organic liquid, preferably an alcohol, such as butanol or another of the azeotroping agents mentioned and azeotropically distilled to remove water. It is thereafter heated under pressure and the liquid flashed off. The product is not only isolated as a dry fluffy powder but it is purified from the acid radical.

Why this sequence of steps effects the removal of acid radical is not understood. It may cause the formation of a volatile compound of the acid radical and the organic liquid. For example, hydrochloric acid as the acid radical can react with an alcohol to form an alkyl chloride which would be volatilized during the venting or flashing step.

The effectiveness of the purification with respect to acid radical varies with the surface area of the fibrous boehmite. At specific surface areas of 200 m.$^2$/g. and below very effective purification occurs with, for example, about 99% of the chloride ion content being removed by venting. The effectiveness drops when the method is applied to higher surface area products. After treatment of a product having a specific surface area of 400 m.$^2$/g., for example, 90% of chloride originally present was removed, The non-aggregated, fluffy, dry products of low anion content obtained as above described, are preferred products of this invention. The products, especially those of surface area less than 250 m.$^2$/g., are characterized by their ready dispersibility in both aqueous and non-aqueous systems. In aqueous systems they are dispersible in both the acid and basic pH regions.

Similar readily dispersible, dry products can also be made by spray-drying aqueous or organosols prepared as above described, by simple azeotropic distillation, or, as previously noted, by freeze-drying such sols.

SURFACE ESTERIFICATION

Fibrous alumina monohydrate prepared according to processes of the invention as above described can advantageously be modified so that the particles receive a chemically attached coating of an organic material. Thus fibrous products of the invention can be coated with silicones such as trimethylchloro silane and polydimethyl-siloxane polymers. The products can also be treated with other surface coatings such as those of Siriani U.S. Patent 2,583,603.

Esterification, or surface reaction, of fibrous alumina monohydrate can be effected by a process which briefly comprises treating the fibrous alumina in the absence of water with an alcohol at an elevated temperature and pressure. The product can be recovered by evaporation of the treating agent.

While the free water content of the mixture existing prior to venting is not critical so long as it does not exceed the composition of the alcohol-water azeotrope, it is convenient to reduce the water content to a fairly low value.

For ease of recovery, the water content ought to be reduced to below about 5 percent and preferably below 0.1 percent by weight based upon the total weight of liquid present. Satisfactory results can be obtained even if the water content approaches the azeotrope mixture composition.

The organosol of fibrous alumina, containing more or less water, is heated to a temperature in the range from about 100° to 300° C. though higher temperatures can be used below the decomposition point of the organic liquid. Corresponding pressures will of course be used. Undesirably long periods of time are required to effect esterification at temperatures as low as 100° C. so that in general a temperature from about 130° to 300° C. is preferred.

The reaction results in the elimination of water and in the formation of a surface ester bond between the alumina and the alcohol. This is a permanent chemical bond as shown by the fact that the alcohol is held under even the most stringent drying conditions such as the use of temperatures in excess of 100° C. in a vacuum of 0.1 micron of mercury. The alcohol can be recovered by hydrolysis and determined as such by infrared.

The esterifying agent used is preferably a primary or secondary monohydric alcohol. Thus there can be used methyl, ethyl, n-propyl, n-butyl, n-amyl, n-hexyl, n-heptyl, n-octyl, n-nonyl, n-decyl, n-undecyl, n-dodecyl (lauryl), n-tetradecyl (myristyl), n-hexadecyl (cetyl), and n-octadecyl (stearyl) alcohols; branched chain primary alcohols such as isobutyl, isoamyl, 2,2,4-trimethyl-1-hexanol and 5,7,7-trimethyl-2-(1,3,3-trimethylbutyl)-1-octanol; secondary alcohols such as isopropyl, sec-butyl, 2-pentanol, 2-octanol, 4-methyl-2-pentanol, and 2,4-dimethyl-3-pentanol. Examples of alicyclic alcohols are cyclopentanol, cyclohexanol, cycloheptanol, and menthol. Examples of alcohols of the class having ethylenic unsaturation are allyl, crotyl, oleyl (cis-9-octadecen-1-ol), citronellol, and geraniol.

The alcohol used can have any number of carbon atoms but it is generally preferred that it contain no more than 18 carbon atoms.

After completion of the esterification reaction the fibrous alumina can be separated from the alcohol in any suitable way. It can be removed by filtration or by simple drying as in a vacuum oven. Where high temperatures are used, the alcohol or alcohol-water azeotrope can be removed by venting the autoclave in which the reaction is conducted.

The percentage of esterification achieved can readily be determined by analyzing the product for carbon and hydrogen and determining surface area by calculation from the dimensions of the particle as determined by an electron micrograph or by determination of the surface area by nitrogen adsorption as previously discussed.

Alternatively, the percentage of coverage of the surface by alkoxy groups can be determined by hydrolysis of the surface ester linkages followed by analysis of the hydrolysate for alcohol content. The number of surface alkoxy groups per square millimicron of fibrous alumina monohydrate surface will normally range from 0.1 to approximately 4.

Readily dispersible products which can be mulled into water or other liquids to form usable suspensions are very important products of the invention. They can be pressed into pellets or other readily handled form, but all are pulverulent so that they are readily redispersible. The preferred products are dry, that is, they do not contain enough liquid water to appear wet or pasty on visual inspection.

The dispersibility of dry products of the invention in various media can be affected in various ways suggested elsewhere herein or by known methods for assisting dispersion of particles of, or near, colloidal size. Thus dispersibility in organic systems can be aided as by treatment with long chain soaps, by treatment with alcohols, by treatment with silicones, and by treatment with other such agents which will provide an organophilic coating. Dispersibility in aqueous systems can similarly be aided by treatment with the relatively short chain alcohols such as methyl, ethyl, and propyl alcohols. Dispersion of dry products of the invention in water is also aided by conventional surface active agents. The presence of minor amounts of soluble salts such as sodium chloride and sodium nitrate in the process for making the alumina fibers also results in products of good dispersibility. Dispersibility in both aqueous and organic systems can also be aided by drying the products in a way which will leave them light and relatively unpacked. Thus they can be spray dried or freeze dried.

COMPOSITIONS CONTAINING FIBROUS ALUMINA PRODUCTS OF THE INVENTION

In addition to the stabilizing acid ion above described there can be introduced into the fibrous alumina sols other stabilizing ions with a dissociation constant less than 0.1 at 25° C., especially after the stronger acids have been removed. For example, there can be used acetic acid, formic acid, sulfamic acid, and carboxylic acids in general, or their salts. Sulfuric and phosphoric acids, or their salts, can be used. The selection of a particular acid radical, and whether the acid itself is used or one of its salts, will depend upon the specific use to which the product is to be put.

Alumina monohydrate fibrils, aggregations of fibrils, and alumina fibers made up of aggregations of fibrils can be incorporated in the various compositions in which they are to be used depending upon their nature. Often the fibrous alumina can be added in a dry form and simply milled or mixed into the composition. Sometimes it will be preferred to transfer the fibrous alumina to a compatible liquid and the resulting sol or dispersion can be added to the composition at a suitable stage in its preparation. Sometimes the liquid will advantageously be removed by distillation or simple evaporation. The liquid used can be an organic liquid, as above described, or it can be water, depending upon the particular composition.

For example, if the fibrous alumina is to be added to a wax emulsion containing a hydrocarbon oil, the fibrous alumina can be transferred to a compatible, and preferably the same hydrocarbon oil prior to addition to the wax emulsion. It is generally preferable in such a case to first transfer the fibrous alumina to a water miscible organic solvent and then to the water immiscible solvent. Similarly, if the fibrous alumina is to be added to an aqueous wax emulsion, it can be added most readily as an aquasol.

Fibrous alumina products of the invention, preferably in a dry form, can be mixed with one or a combination of dry lubricants such as graphite, molybdenum sulfide, talc, and powdered mica. Compositions of this type can be used for lubricating the surface of metals during forming operations, including rolling, stamping, drawing, and die casting. The lubricant composition can be applied to the metal prior to the forming operation or applied to the surface of the forming equipment. It can be applied to the inner surface of molds into which metals are cast.

Fibrous boehmite, that is, fibrous alumina monohydrate having the boehmite crystal lattice, either dry or in a suitable organic solvent, can be mixed with volatile oils; for example, kerosene, gasoline, and naphtha, or with organic solvents such as benzene, carbon tetrachloride, etc. Such mixtures can be applied to surfaces for the same purposes as are above set forth for dry mixtures. In this case, the evaporation of the volatile component leaves the fibrous boehmite as the lubricant on the treated surface.

Oils that can be used to make greases by admixture with fibrous boehmite as a thickener are the hydrocarbon oils, fluorocarbon oils, silicone oils, vegetable oils, stearic acid and other long chain fatty acids, polymeric esters, diesters, such as di-2-(ethyl hexyl) sebacate, cottonseed oil, whale oil, polyethers such as polyethylene oxide oils, castor oils; in fact any animal, vegetable or mineral oil can be used, and also synthetic chemicals having typical oily characteristics. Fibrous boehmite can also be used with hydrophilic oils, such as polyethylene oxide oils. Fibrous boehmite can also be used in any oil composition containing a water immiscible oil.

The proportion of fibrous boehmite used as a thickening agent will depend upon such factors as the character and viscosity of the oil, the nature of the grease which it is desired to produce, and the exact nature of the boehmite itself. While it is sometimes feasible to use as high as 70% of the boehmite in the grease composition, it will ordinarily be found that a smaller amount is adequate. The action of the boehmite is pronounced even with small amounts, and excellent greases have been made using from 3 to 15% of the boehmite.

The mixing of the oil and fibrous boehmite is carried out in any manner which has heretofore been used for introducing other non-soap thickeners into oil. Fibrous boehmite can be used in conjunction with conventional soap-type thickeners, such as sodium or lithium stearates or hydroxy stearates.

When added to oils in smaller quantities than sufficient to thicken the oils to greases, say 0.1 to 3%, fibrous boehmite gives compositions which show much less change in viscosity with temperature than does oil alone over a wide range of temperature.

The water resistance of these greases can be improved by methods known in the art, e.g. U.S. 2,599,683 and 2,583,603. The fibrous boehmite alumina can also be coated with a monomolecular layer of a long chain soap in order to improve its dispersibility in a hydrocarbon oil medium and the water resistance of the resulting grease.

Fibrous boehmite can advantageously be included in cosmetics, either as a dry product or dispersed in a suitable organic liquid. Greases, salves, creams, cosmetic emulsions, hair oil, lipstick, face powder, anti-perspirants, deodorants, and theatrical make-up materials can be improved by incorporation of fibrous boehmite, in amounts of, say 1 to 20%. In aqueous formulations of such products, fibrous boehmite is especially useful as a thickening, emulsifying, dispersing, and suspending agent.

Fibrous boehmite can also be used as an adsorbent or carrier for enzymes, viruses, alkaloids and various antibiotics and vaccines.

Because of its film-forming nature fibrous boehmite is useful in compositions for treating peptic ulcers, alone or in combination with conventional formulating agents. The fibrous alumina monohydrate products of the invention can be included as a thickener in food products, for example, in ice cream. The fibrous boehmite can be dyed with appropriate food dyes and added to food products to effect both thickening and coloring.

Inks, such as printing inks for letterpress, lithographic or gravure type processes, are improved by incorporation of fibrous boehmite as a dispersing, thickening and extending agent. Because of the film-forming properties of fibrous boehmite, superior adhesion to papers and fabrics is obtained, and clarity and definition of the print is improved. With colored inks in particular, small amounts of fibrous boehmite enhance brilliance, brightness or depth of shade. Because of substantivity to fibrous boehmite, pigments and dyes may, if desired, be adsorbed on the surface of the boehmite fibrils prior to incorporation in the ink formulation.

Fibrous boehmite is useful at concentrations of 0.5 to 25% as a thickener, dispersant or emulsifying agent in aqueous floor wax emulsions or pastes utilizing conventional components such as carnauba, candellila, beeswax or synthetic waxes, and natural or synthetic resins. On drying, improved leveling and polishing properties may be realized, with better hardness, scuff resistance or anti-slip properties.

Fibrous boehmite can be incorporated into elastomer products in amounts of 1–30% by weight to improve strength and/or abrasion resistance. This can be done at any point in their manufacture, including the original formation of the polymer. Generally, however, fibrous boehmite will be incorporated by conventional milling and compounding techniques commonly employed with other fillers. The elastomer in which fibrous boehmite is incorporated according to this invention can be any rubber-like polymeric material. The term "elastomer" is a general descriptive term for this class of products and may be regarded as an abbreviation for "elastopolymer" or "elastic polymer." (See "Advances in Colloidal Science," vol. 2, 1946, p. XXV.) As here used it may be understood to cover the high molecular elastic colloidal natural caoutchouc, as well as synthetic rubbers and rubber-like materials such as Neoprene, butyl rubber, and the styrene-butadiene copolymer known as GR–S-types, butadiene-acrylonitrile copolymers, polybutadienes, and the polyisoprenes.

It will be noted that the invention is applicable to diene elastic polymers as a class. Fibrous boehmite can also be used with chlorosulfonated polyethylene, and fluorocarbon rubbers, polyester rubber, silicone and polyurethane rubbers.

A finished sponge or foam of natural or synthetic rubber or other elastomer can be treated with an aqueous boehmite sol, say a 2 to 15% $Al_2O_3$ sol in order markedly to improve the load carrying capacity of the foam.

The normally hydrophobic surface of a polyurethane type sponge can be made hydrophilic by treatment with 0.5 to 10% of a fibrous alumina monohydrate product of the invention followed by drying of the treated sponge at 50 to 110° C.

Fibrous boehmite can be used in plastics in manners analogous, and in amounts comparable, to those described for the use in rubber. For example, fibrous boehmite can be used as a reinforcing filler in making plastic films, coatings, paints, adhesives, or other plastic articles. When incorporated into the organic polymer prior to extrusion into sheets, tubing, or lacing, the fibrous boehmite improves the tensile and/or impact strength. Among organic plastic materials which are especially benefited by incorporation of 1—40% of fibrous boehmite are melamine-, urea-, and phenolformaldehyde plastics, polyester resins, alkyd resins, epoxy resins, polyvinyl acetates, polyvinyl acetals, polyvinyl alcohols, polyethylenes, polyacrylic esters, polyacrylonitrile, silicone plastics, regenerated cellulose such as celophane and rayon. Fibrous boehmite may be mixed with aqueous dispersions of such polymers or it may be added in the process of their formation, as for example during the polymerization in the case of vinyl polymers. In aqueous emulsion or dispersion polymerizations, it may serve as a dispersing or nucleating agent when used alone or in the presence of other more conventional dispersing or emulsifying agents.

It is to be noted that fibrous boehmite can be used for the surface treatment of practically any type of article. Thus painted surfaces, solid plastic objects, paper, rubber articles, textiles and upholstery and other fabrics including pile fabrics such as rugs can be treated. The surfaces can be treated by applying a dried fibrous boehmite by vigorous rubbing, or more easily by applying an aqueous or organic sol of the boehmite.

Fibrous boehmite can be applied also to the surface of fibers, not only synthetic fibers such as nylon polyamides, "Orlon" acrylic, "Dacron" polyester, cellulose acetate and rayon, but also natural fibers such as wool, cotton, silk, ramie, hemp, alpaca, camelhair, fur, feathers, goathair, horsehair, and animal bristles generally. Not only can the fibrous boehmite be applied as a surface coating on individual fibers, but can also be impregnated onto the surfaces of twisted threads and woven textiles, as noted above. The treatment of such surfaces prevents the deposition and retention of soil and also beneficially modifies the surfaces in respect to the pick-up of static electricity.

Fibrous boehmite can be incorporated into organic fibers prior to drawing and spinning, in amounts ranging from a trace up to high percentages, say 0.1 to 50%, depending upon the effects desired. Fibrous boehmite can be incorporated into fibers of the following organic polymeric types: nylon, "Orlon" acrylic fiber, cellulose acetate, polyvinyl chloride, polyethylene, rubber, "Teflon," polytetrafluoroethylene, "Dacron" polyester fiber and all synthetic organic compositions capable of being formed into threads or fibers. The fibrous boehmite may be incorporated into the fibers in various ways, including dispersion in the fiber melt, dispersion in the polymer latex prior to forming threads, dispersion in the polymer solutions prior to wet or dry spinning, or incorporation into polymer sheeting which is subsequently slit into ribbons or threads. In small amounts, the fibrous boehmite improves the dyeing and drawing characteristics, and when incorporated in the form of aggregates sufficiently large to promote the scattering of light and a certain degree of surface roughening, it acts as a delusterant and improves the antislip properties of the fiber. At relatively high concentrations, for example 5–25%, fibrous boehmite produces desirable increases in modulus, tenacity or elongation, and with some polymers improved hihg temperatures characteristics.

In any of the foregoing uses and in many others, fibrous boehmite can be used as a lake subsstrate and added to any of the various compositions described. For example, the fibrous boehmite can be dyed while in water solution or in an appropriate organic solvent and the dyed fibers can be included in plastics which are subsequently to be formed into films, threads, or the like. Similarly, they can be used in various compositions where it is desired to impart color as well as the valuable physical properties resulting from the use of fibrous boehmite.

Fibrous boehmite when ignited above about 1000° C. gives a fibrous form of anhydrous alpha-alumina. This novel fibrous alpha-alumina is useful in the manufacture of refractories by combining it with finely divided metal oxides and firing. Pure alumina sintered bodies can be prepared by compressing the dehydrated fibrous boehmite before firing, preferably with a small amount of an organic binder which burns out the mass. Thus, organic soluble metal salts such as aluminum acetatae or metal stearates may be used.

Porous are cellular ceramic bodies with higher compressive strength can be obtained by the incorporation of dehydrated fibrous boehmite. The ceramic body can be made by including in the original mix carbonaceous materials which are later burned out. Or destabilized hydrogen peroxide which evolves oxygen gas during heating can be used in place of the carbonaceous material.

Powdered metals are improved by incorporation of fibrous boehmite. The fibrous boehmite can be mixed with the powdered metals to form a thin insulating coating on the metal particles. Metal compositions containing 0.01% to 10% by weight fibrous boehmite, after compression and sintering, contain a unique distribution of the fibrous boehmite throughout the metal structure, providing improved strength, particularly in compression. With the incorporation of large proportions of fibrous boehmite such as 10% to 70% by weight, the sintered metal products show lower mechanical strength but also lower thermal conductivity, which is important, particularly in the cases of the metal products to be exposed to very high temperatures.

Fibrous boehmite can also be used in the production of the newer types of "cermets" or metal-ceramic composite structures, in conjunction with powdered metals such as chromium, nickel, cobalt, iron, etc. Such composite structures can be made by intimately mixing the finely divided metal and fibrous boehmite alone or in combination with other refractory oxides such as beryllia, chromia, magnesia, etc. and compressing or extruding at a high temperature in an inert or reducing atmosphere.

Fibrous boehmite as a thin, carefully dehydrated film on metals yields a thermal and electrical insulating protective coating. Thus it can be applied from a 2 to 10 percent sol to aluminum, which preferably has been cleaned to remove oxides. It can then be heated in boiling water to complete the protective coating.

Extremely thin films of fibrous boehmite can be used to promote the adhesion of two dissimilar materials by providing high surface area anchor points. For example, fibrous boehmite films can be used to improve the bond between a paint film and a metallic surface, between various polymer films such as "Mylar," copolyester of ethylene glycol and terephthalic acid, or regenerated cellulose and other substrates such as metals, glass or other films.

Binders for fibrous ceramic products such as rock wool and glass fibers are improved through the incorporation of 2 to 20% by weight of fibrous boehmite. The fibrous boehmite is highly substantive to surfaces containing silica and can act as a binder itself. For example, phenol formaldehyde resin emulsions can be mixed with fibrous boehmite or alkyd resin emulsions and applied to the fibrous inorganic material to obtain strong bonds which retain their strength even after the organic portion of the bond is burned away at high temperature, the residual alumina forming the body of the bond. For this application a distribution of particle sizes of fibrous boehmite is preferred but not necessary.

Fibrous boehmite can be used as a base for cracking catalysts and other alumina catalysts. The fibrous boehmite sols can be mixed with a silica sol to form a gel which after drying and dehydrating can be formed into pellets or mats. For example, chromia supported on a dehydrated fibrous boehmite or a silica alumina co-gel support can be used as a catalyst for the low pressure polymerization of 1-olefins, such as ethylene. The fibrous boehmite can be formed into suitable beads or particles together with other catalytic agents in conventional manner.

Films of fibrous boehmite can be used as such or in combination with minor amounts of organic and inorganic materials to modify the properties of fibrous boehmite films. For example, the films can be modified with polyvinyl alcohol, "Teflon" polytetrafluoroethylene, "Mylar" polyester film, polyethylene, and polyvinyl fluoride.

Inorganic materials, especially those of a fibrous or plate-like nature, can also be used to modify fibrous boehmite films. For example, small amounts (e.g., less than 10–20%) of minerals such as bentonite, attapulgite, wollastonite, halloysite, kaolin, talc, exfoliated vermiculite, mica, especially waste mica splittings, asbestos, etc., can be used. Synthetic fibrous materials in small amounts such as glass fibers, "Fiberfrax" ceramic fiber, finer fractions of rock wool, etc., also can be used.

Fibrous boehmite is several times more efficient than alum in rosin-alum sized papers, and at the same time is able to cause an increase in the spreading of ink on the papers.

Fibrous alumina monohydrate is quite useful when incorporated either as a filler or as in situ mixtures with tobacco in cigarettes. At 1 to 10% concentration the products of this invention filter out a high percentage of the tars and other undesirable constituents of tobacco smoke and give a mild, free-burning, easily drawing cigarette.

In order that the invention may be better understood, the following specific illustrative examples are given in addition to the examples already given above:

EXAMPLE 1

A basic aluminum chloride solution was prepared according to the teaching of U.S. Patent 2,196,016 as follows:

241.4 grams of aluminum chloride hexahydrate were dissolved in 1,000 grams of water. 27 grams of aluminum metal powder was then carefully added to the solution of aluminum chloride. At the outset of the aluminum addition, the solution was heated to about 65° to initiate the reaction and then the remainder of the aluminum was added cautiously while agitating the mixture vigorously. Once started, the reaction proceeded exothermically with the evolution of hydrogen.

The basic aluminum chloride solution obtained contained by analysis 8.00% $Al_2O_3$ and 8.43% Cl. The alumina molarity calculated as $Al_2O_3$ was 0.90. The solution had a specific gravity of 1.1388 at 25° C., a pH of 2.96 and a specific conductivity of 96,600 micro mhos/cm. The value of $\theta$ was under one minute.

Ten volumes of the above solution was diluted with water to 100 volumes. The diluted solution had an alumina content equivalent to 0.09 molar as $Al_2O_3$, and a molarity of the acid radical, chloride, of 0.271. The pH of this solution was 4.01 and the specific conductivity was 21,340 micro mhos/cm.

The solution was heated in a sealed glass container at 160° C. for 16 hours. During this heating, fibrous boehmite precipitated in the initially water clear solution. The fibrous boehmite was readily dispersed upon gentle shaking. The resulting suspension had a pH of 1.78 and a specific conductivity of 27,100 micro mhos/cm.

Examination of the boehmite by means of an electron microscope at a magnification of 25,000 diameters showed that the fibrils produced had in large measure axial ratios of at least 50 to 300 and diameters of 5 to 10 millimicrons. Some parallel alignment of the fibrils had occurred to produce aggregate bundles. The product appears as in Figure 2 of the drawings.

EXAMPLE 2

A basic aluminum chloride with a molar ratio of $Al_2O_3/Cl=2/3$ was prepared by a method similar to that described in Example 1, viz., 241.1 grams of aluminum chloride crystals were dissolved in 1,000 grams of water, and then to this solution 81.0 grams of aluminum metal powder was added uniformly and slowly until all the metal had dissolved and no more hydrogen was evolved. As before, the solution was pre-heated to about 50–60° C. to initiate the reaction, after which the heat was removed but the temperature remained at about 80–90° C. throughout the reaction.

The product of this reaction was water clear and slightly more viscous than the corresponding solution obtained in Example 1. Analysis of this solution showed that it contained on a weight basis, 15.4% $Al_2O_3$ and 8.05% Cl which corresponds to a molar ratio $Al_2O_3/Cl$ of 0.67/1.00, and an alumina molarity of 1.86. The density of this solution at 25° C. was 1.2244 g./cm.³, while the pH and specific conductivity were 3.11 and 77,600 micro mhos/cm., respectively. The value of $\theta$ was under one minute.

Five volumes of this solution were diluted up to a total of 100 volumes with distilled water and the mixture shaken. The concentration of alumina in this solution was 0.093 molar (as $Al_2O_3$) while the chloride molarity was 0.140. This water clear solution had a pH of 4.08. It was then placed in a sealed glass container and autoclaved for five hours at 160° C. Upon cooling, the material removed from the autoclave contained a white precipitate which, upon electron microscopic examination and X-ray diffraction examination was shown to contain very long hair-like fibrils of alumina monohydrate having the boehmite crystal lattice. Practically all of these fibrils of boehmite alumina had formed "tactoids" by a sidewise parallel alignment, and these small tactoids had, in addition, aligned themselves in an end-to-end fashion to product very long fiber bundles of boehmite alumina as illustrated by Figure 1.

The fine hair-like ultimate fibers or fibrils of alumina were about 3–10 millimicrons wide and about 0.5–1.0 micron long and were clearly visible at a magnification of 25,000 diameters; the individual "tactoids" or sidewise aggregates of ultimate fibers were about 0.25–0.5 micron wide and 0.5–1.0 micron long; the end to end aggregated tactoids were about 0.25–0.5 micron wide and as much as 5–10 microns long. No other crystalline shapes or other crystalline forms of alumina could be detected in the sample. The product appears as in Figure 1 of the drawings.

The pH of the suspension of this readily dispersible precipitate was 2.03. This suspension would easily pass through a filter paper when vacuum filtered. When dried down, this suspension formed a thin film which remained coherent and translucent when removed from the substrate.

EXAMPLE 3

A solution was made by dissolving in 98 parts by weight of water 2 parts by weight of a solid water soluble basic aluminum chloride product. Chemical analysis of the solid basic aluminum chloride showed that it contained 45.72% $Al_2O_3$, 16.58% chloride, and 33.27% volatile matter calculated as water, thus having a composition corresponding to an $Al_2O_3$/chloride ratio of 0.96/1. X-ray diffraction studies showed the water-soluble solid to be amorphous. The dried aqueous solution did not contain discrete structures or particles on examination with an electron microscope at 25,000 diameters. The value of $\theta$ was under one minute.

The solution made as above had a pH of 4.44 and a specific conductivity of 6,760 micro mhos/cm. The solution was heated in a sealed glass container for 16 hours at 165 to 170° C. There was thereby obtained a stable opalescent alumina sol having a pH of 2.32 and a specific conductivity of 15,700 micro mhos/cm.

Examination of the sol by electron microscope at a magnification of 25,000 diameters revealed that the sol contained long fibrils having axial ratios of at least 50:1 and breadths in the colloidal range. The fibrils were identified as having the boehmite crystal lattice by X-ray diffraction. The product appears at 50,000 diameters as in Figure 3 but is slightly broader and slightly longer.

A fibrous alumina aquasol, the fibrils of which have a specific surface area of about 200 m.$^2$/g., was transferred to normal propanol by azeotropic distillation. To this there was added a small amount of alizarin yellow GG until the fibrous boehmite had a brilliant yellow color. The normal propanol was removed. The yellow fibrous boehmite powder together with about an equal weight of undyed fibrous boehmite was incorporated in a total amount of 10% by weight in polyethylene molding powder. Brilliant yellow films which were quite clear and transparent were obtained. Similar colored films were also obtained using a variety of dyes in the same way.

EXAMPLE 4

242 grams of aluminum chloride hexahydrate were dissolved in 1,000 grams of water. This solution was heated to about 50–60° C. and then 135 grams of aluminum metal dust were slowly and uniformly added with good agitation. After once starting, the reaction proceeded exothermically with the evolution of hydrogen and the temperature remained at about 80–90° C.

The resulting solution was almost water clear but perceptibly viscous. Analysis of the solution showed that it contained 22.73% $Al_2O_3$ and 7.58% Cl which corresponds to an $Al_2O_3$/Cl mole ratio of 1.04/1. The density of this solution was 1.322 g./cm.$^3$ at 25° C. The pH and specific conductivity were 3.81 and 53,400 micro mhos/cm., respectively. Ten volumes of the solution prepared as above was diluted to 100 volumes with distilled water. The resulting clear solution had an alumina concentration of 0.295 molar, a chloride content of 0.283 molar, and a pH of 4.51. The value of $\theta$ was under one minute.

This solution was heated in a sealed glass container at 160° C. for 5 hours. The heating in the sealed glass container converted the clear solution to a translucent, semi-rigid, spontaneously birefringent gel. By simply diluting with distilled water and mild shaking by hand, this gel readily reverted to a stable opalescent sol exhibiting streaming birefringence. The sol could be filtered unchanged.

The alumina in the redispersible gel of this example was alumina monohydrate having the boehmite crystal lattice. Electron microscope examination at 25,000 diameters showed that only fibrous alumina was present, most of the fibrils having a breath in the order of 5 to 10 millimicrons and an axial ratio of about 200:1. In some cases, 3 or 4 of the fibrils were aggregated side by side to product longer aggregate fiber lengths. The product appears at 50,000 diameters as in Figure 3 of the drawings but they are somewhat shorter and narrower.

Figure 3:
Figure 3 is a similar showing at 50,000 diameters' magnification of a product in which the fibrils are more aggregated, in an oriented fashion, than in Figure 2. The black, circular objects in this and in following photomicrographs are polystyrene latex particles having a diameter of 280 millimicrons.

It is noted that, particularly with products as fine as those of Figures 2 and 3, it is difficult to state the exact breadth and, often, even the exact length from an examination of the electron micrograph. After an examination of these products by nitrogen absorption and by streaming birefringence as previously noted, one is enabled to interpret the electron micrographs more accurately and to make more exact calculations of the physical dimensions of the products seen.

EXAMPLE 5

3. 3 volumes of the concentrated basic aluminum chloride solution prepared as described in the first paragraph of Example 4 was diluted to 100 volumes with distilled water. The molarity of alumina in the resulting dilute solution was 0.097 and the chloride molarity was 0.0934. The pH and specific conductivity of this clear solution were 5.20 and 6,190 micro mhos/cm. respectively. The valve of $\theta$ was under one minute.

A portion of the dilute solution was heated in a sealed glass container for 16 hours at 160° C.

The product resulting from the heating treatment was a stable, sediment-freed, opalescent, film-forming, thixotropic alumina sol, the alumina being in the form of fibrous alumina monohydrate having the boehmite crystal lattice. The product had a pH of 2.51 and a specific conductivity of 10,650 micro mhos/cm. The product appears at 50,000 diameters as in Figure 3 of the drawings, but is somewhat broader.

A portion of fibrous boehmite sol prepared generally as above but containing particles of 7 millimicrons diameter and of lengths from a half to one micron, was transferred to normal butanol by azeotropic distillation at constant volume. This solution was placed in an autoclave, heated to 300° C. and vented to remove the alcohol and acid radical. The product was then vacuum dried to remove residual butanol.

The white fluffy powder thus produced was incorporated in a grease prepared from a mid-continent solvent treated petroleum oil (viscosity 300 SUS at 100° F.) by milling the oil with 13% by weight of the fibrous boehmite on an ink mill.

The grease obtained was clear and homogeneous. Its consistency was greatly increased by the inclusion of the fibrous boehmite. The grease was stable to comparatively long exposures at elevated temperatures, say up to 150° F.

A clear and homogeneous grease can also be obtained by milling a mixture of 13% of a dried fibrous boehmite as just described with a silicone oil having a viscosity of 100 centistokes at 25° C.

Fibrous boehmite can be incorporated into natural rubber employing techniques common in the art. For example, fibrous boehmite dried by azeotropic distillation, as above described, can be compounded into a formulation as follows:

| Ingredients: | Parts by weight |
|---|---|
| Smoked sheet | 100. |
| Zinc oxide | 5. |
| Phenyl α-naphthylamine | 1. |
| Fibrous boehmite | 60. |
| Stearic acid | 1. |
| Sulfur | As indicated. |
| Benzothiazyl disulfide | 2. |
| Tetramethyl thiuram disulfide | 0.1. |

The fibrous boehmite can be any of those herein described, and specifically there can be used a fibrous boehmite dried by azeotropic distillation and having fibril diameters of about 5 millimicrons and fibril lengths of about one-half to one micron. The blend can be cured according to conventional methods to give rubber of increased tensile strength.

A granular, solid polyethylene molding powder, such as "Alathon"-1 polyethylene resin made by Du Pont, can be modified by milling thereinto an equal weight of a dry fibrous boehmite of the type above described. Thus there can be used a fibrous boehmite having a surface area of 200 m.$^2$/g. and the boehmite fibers can have an average diameter of about 7 millimicrons and lengths of from one-half to one micron.

The polyethylene containing fibrous boehmite was molded into a thin film. The film was clear and it was stiffer than a similar film not containing fibrous boehmite. The film so treated was immersed in a dilute acid dye solution "eosine," a red dye, and the film dyed a deep, brilliant red. Without the fibrous boehmite present a film of polyethylene could not thus be dyed.

The dye film was fast when treated with a boiling aqueous solution of a commercial detergent.

A 15% solution of polyacrylonitrile, of a type used for spinning textile fibers, in dimethylformamide was mixed with fibrous boehmite of the type just described. Five parts by weight of fibrous boehmite was added to 100 parts by weight of the solution and a film was prepared by casting an allowing the dimethylformamide to evaporate. The fibrous boehmite imparted dyeability to the polyacrylonitrile film when dyed with "eosine."

In addition to the above examples, fibrous boehmite was incorporated into a variety of commercial paints of the water-base type, rubber-emulsion type, alkyd-resin type, and nitrocellulose based paints and in each instance the films obtained were of improved character.

EXAMPLE 6

105 grams of aluminum metal powder were added slowly and uniformly with stirring to a solution of 323 grams of concentrated hydrochloric acid solution (sp. gr. 1.1878) in 677 grams of distilled water. Preheating was not necessary since the reaction soon became rather vigorous.

There resulted a water clear and not very viscous solution having a pH of 2.66 and a specific conductivity of 88,400 micro mhos/cm. The density of the solution was 1.2446 g./cm.³. By chemical analysis, the solution contained 14.7% $Al_2O_3$ by weight and 10.9% Cl by weight. The value of $\theta$ was under one minute.

5.15 volumes of the above solution was diluted to 100 volumes. The diluted solution was 0.095 molar with respect to alumina and 0.204 molar with respect to chloride ion. It had a pH and specific conductivity of 3.90 and 15,300 micro mhos/cm. respectively.

The diluted solution was heated in a sealed glass vessel for 16 hours at 160° C. There resulted an aqueous dispersion of a fine white, readily dispersible precipitate. The dispersion exhibited streaming birefringence. The dispersion had a pH of 1.67 and a specific conductivity of 23,700 micro mhos/cm. The precipitate was alumina monohydrate having the boehmite crystal lattice. Examination under the electron microscope at 25,000 diameters revealed that the ultimate alumina particles were fibrous with some of the fibrils aggregated sidewise into tactoids. Many of the fibrils had diameters of about 10 millimicrons and axial ratios of greater than 50:1. The product appears at 50,000 diameters as in Figure 3 of the drawings, but with more side-to-side aggregation.

EXAMPLE 7

Using the procedure of U.S. Patent 2,763,620, a 1 N solution in water of a commercial sodium aluminate having an $Al_2O_3/Na_2O$ mol ratio of 0.966/1 was prepared. An 0.5 N aqueous solution in water of hydrogen chloride was also made. These two solutions were added gradually, simultaneously over a one hour period to a reaction vessel originally containing 300 parts by volume of distilled water which had been acidified with hydrochloric acid to pH 4.25.

The sodium aluminate solution and the hydrochloric acid solution were added with agitation to the reaction vessel at such rates relative to each other as to maintain the liquid mass in the vessel at about pH 4.25 throughout. The temperature of the reaction mass was kept at about 95° C. throughout the addition. A total of 1,000 parts by volume of the sodium aluminate solution and 1,440 parts by volume of the hydrogen chloride solution were added during the one hour period.

The above process gave as a starting material for the preparation of the fibrous boehmite an opalescent, stable alumina sol analyzing 0.867% $Al_2O_3$ by weight having a pH of 4.20 and a specific conductivity of 24,000 micro mhos/cm. The value of $\theta$ was under one minute.

The above aqueous dispersion of alumina was heated for 16 hours at 150–160° C. in a sealed glass vessel.

There was thereby obtained a very viscous, turbid, slightly thixotropic, stable sol of alumina monohydrate having the boehmite crystal lattice. The sol had a pH of 2.0 and a specific conductivity of 31,500 micro mhos./cm. The sol exhibited streaming birefringence when stirred between crossed light polarizing sheets.

Electron microscope examination of the alumina in the sol showed that alumina was fibrous and that larger cubical crystals of sodium chloride were also present in the micrograph. The alumina fibrils in the sol were about 5–7 millimicrons in diameter and had axial ratios of about 100:1. They were, for the most part, non-aggregated but they readily aligned in side-to-side fashion to produce tactoids upon addition to the sol of sodium hydroxide to raise the pH of 4.50. The product appears about as in Figure 3 of the drawings, but this micrograph does not contain the salt crystals.

The fibrous boehmite sol was purified to remove excess sodium chloride by static dialysis for 66 hours against distilled water using cellophane films. The dialyzed sol had a pH of 4.0 and a specific conductivity of 255 micro mhos./cm. By analysis, it contained 0.890% $Al_2O_3$ and 0.01% Cl. The sol was now opalescent and practically all of the thixotropic viscosity had disappeared. The sol exhibited strong streaming birefringence. It also showed schlieren effects when swirled in a bottle.

Electron microscope examination of the particles of the dialyzed sol showed that the boehmite was in the form of discrete fibrils, there being practically no parallel aggregation of the fibrils. All of the cubical sodium chloride crystals had disappeared. This product appeared as in Figure 2.

The dialyzed sol when poured on to a glass or mercury surface readily dried to a smooth, transparent, continuous, coherent solid film of boehmite. As so cast, the film was water sensitive but upon heating to 600° C.–1,000° C. for a few hours, it was converted to a water insensitive film not attacked by strong acids such as hydrochloric acid. Hydrophobic, self-supporting, coherent films of fibrous boehmite are easily made by pouring the dialyzed sol of this example into a glass trough or similar container which has previously been treated with a silicone oil parting agent or similar hydrophobing agent and then allowing the sol to dry. The resulting films can be peeled from the substrate in flat sheets having, for example, a thickness of 75 to 125 microns.

The process for preparing the starting aqueous dispersion of alumina from sodium aluminate and hydrochloric acid, as described above, is disclosed and claimed in my application Serial No. 260,090, filed December 5, 1951, now U.S. Patent 2,763,620.

EXAMPLE 8

100 parts by volume of distilled water adjusted to pH 5.0 was charged into a glass reaction vessel fitted with a thermometer, reflux condenser, heater, and inlet and exit tubes connected through a circulating pump.

A 0.250 molar solution in water or $AlCl_3.6H_2O$ and a 0.758 molar aqueous solution of $NH_4OH$ were added simultaneously into the turbulent circulating stream created by the pump in the circulating lines. These solutions were fed into the circulating line over a period of 6 hours at such rates relative to each other as to maintain the pH of the material in the reaction vessel within the range of about pH 4.0–5.0 throughout the period. The contents of the reaction vessel were kept at about 80° C. throughout.

The above process gave as a starting material for the preparation of fibrous boehmite a translucent, opalescent alumina sol having a pH of 4.34. The starting material had an alumina concentration calculated as $Al_2O_3$ of 0.129 molar and a chloride concentration (in excess of the chloride stoichiometrically equivalent to the $NH_4^+$ ion present) of 0.0621 molar. The value of $\theta$ was under one minute. Electron microscope examination of this starting sol showed that there was present no anisotropic crystalline alumina, the only crystals present being readily vaporized ammonium chloride which disintegrated under electron bombardment. This starting sol would not form coherent, transparent films on glass.

The above alumina sol was heated for one hour in an autoclave at 150–160° C. and was thereby converted to a very viscous, translucent sol of alumina monohydrate having the boehmite crystal lattice and exhibiting streaming birefringence. It was found by examination with the electron microscope that the alumina was fibrous. The pH and the specific conductivity of the boehmite sol were 2.72 and 43,200 micro mhos/cm. respectively.

After dialyzing this sol through cellophane and against distilled water for 15 days at room temperature, the pH and specific conductivity were 5.80 and 13.5 micro mhos/cm. respectively. The dialyzed boehmite sol was less turbid than the original boehmite sol but still rather viscous and it still exhibited streaming birefringence when agitated slightly. Electron microscope examination showed that the dialyzed sol now contained as a solid only fibrous boehmite, the ammonium chloride crystals having been eliminated. The fibrils of boehmite had diameters of about 3 millimicrons and axial ratios of greater than 100:1. The product appears as in Figure 2 of the drawings, but is shorter and thinner. The sol readily formed transparent films when dried down on a glass substrate.

One-half part by weight of fibrous boehmite, 400 m.$^2$/g., prepared as above, deionized by ion exchange and dried by azeotropic distillation followed by venting was mixed with 9.5 parts by weight of granular polyethylene and the components were milled together until the mixture was homogeneous.

A 15 mil film was molded from this mix by pressing at 8000 p.s.i.g. and 145° C. between aluminum metal foils. After pressing it was found that the aluminum foil adhered very strongly to the polyethylene.

A control experiment with no fibrous boehmite in the polyethylene yielded a film from which the aluminum foil readily parted.

Textiles were treated using a fibrous boehmite alumina sol prepared generally as above but using a different starting material, a basic aluminum chloride solution with an $Al_2O_3$:Cl ratio of 1:1 and with a concentration of 2% $Al_2O_3$, by heating in an autoclave for 1 hour at 160° C. Part of the chloride in the resulting sol was removed by an ion exchange resin.

"Orlon" acrylic fiber cloth, "Dacron" polyester cloth, glass fiber cloth and cotton cloth were immersed in the alumina sol, removed and then dried. These were then immersed into a red dye solution of eosine and dried. In every case the sample containing the alumina was dyed a deeper color than a control which was untreated.

Boiling both the test and control samples showed that in the latter case all of the dye was removed but with fibrous boehmite treated product practically all of the dye remained in the cloth.

Analogous results are obtained with other materials such as paper.

EXAMPLE 9

54 grams of aluminum metal powder was added gradually to a solution of 375 grams of $Al(NO_3)_3 \cdot 9H_2O$ dissolved in 1,000 grams of distilled water which had been preheated to 80–90° C. An exothermic reaction proceeded with copious evolution of reddish-brown fumes of oxides of nitrogen.

There was obtained from the above process a water-clear solution having a pH of 4.06, a specific conductivity of 53,500 micro mhos./cm., and analyzing 9.57% $Al_2O_3$ and 7.15% $NO_3$ by weight. The value of $\theta$ was under one minute.

6.66 parts by volume of the above solution freshly prepared was diluted to 100 parts by volume with distilled water. The diluted solution had a pH and a specific conductivity of 4.77 and 6,310 micro mhos/cm. respectively.

Heating the diluted solution in a sealed glass vessel for 16 hours at 160° C. produced a stable, opalescent, sediment-free sol of alumina monohydrate having the boehmite crystal lattice which exhibits streaming birefringence. By examination on the electron microscope, it was found that the alumina was present in fibrous form, the ultimate fibrils having breadths within the colloidal range and having axial ratios about 50:1. The product appears as in Figure 2 of the drawings, but is broader.

EXAMPLE 10

As an example of a concentrated colloidal dispersion of fibrous boehmite, a sol similar to that described in Example 5 was prepared and found to contain particles having a specific surface area of 200 m.$^2$/g. This sol was agitated violently with a high speed stirrer, and chloride ion was removed by use of the bicarbonate form of an ion exchanger to the point where the pH of the sol was 5.2, and the chloride ion concentration was 0.01%. The $Al_2O_3$ concentration was then 1.0%. This purified sol was concentrated by vacuum evaporation to obtain a fluid, film-forming, stable colloidal dispersion of fibrous boehmite, containing 15% by weight of $Al_2O_3$. In another similar preparation, a sol containing 18.5% $Al_2O_3$ was obtained; this sol was also a stable, fluid product.

EXAMPLE 11

A basic aluminum chloride solution with a mol ratio of $Al_2O_3$:Cl of 1:1 was prepared from aluminum metal and aluminum chloride. The preparation was carried out in a 12-liter, 3-neck round bottom flask fitted with a reflux condenser, thermometer, agitator, and heating mantle. Four thousand grams of distilled water was weighed out and placed in the flask. In this distilled water 965.76 grams (four moles) of aluminum chloride hexahydrate was dissolved. To this aluminum chloride solution was added, with agitation, 539.4 grams (20 moles) of ether extracted aluminum metal dust, over a period of about 10 hours and at a temperature ranging from about 75° C. to about 95° C. The final basic aluminum chloride solution was very slightly opalescent and had a pH of 3.5. Chemical analysis of this solution showed that it contained 22.80% $Al_2O_3$ and 7.59% chloride (by weight) which corresponds to an $Al_2O_3$:Cl ratio of 1:1. The value of $\theta$ was under one minute.

The concentrated basic aluminum chloride solution thus prepared was diluted to a concentration of about two percent $Al_2O_3$ by weighing out 269 grams of the solution and diluting it to 3,000 grams with distilled water.

The solution was then heated at 160° C. for 16 hours to polymerize the basic aluminum chloride to a fibrous boehmite alumina sol.

The product thus obtained was somewhat gel-like but between crossed "Polaroids" showed intense birefringence. After agitation in a "Waring Blendor" the sol was turbid but homogeneous and fluid. Its pH was 2.46 and chemical analysis showed that it contained 2.18% $Al_2O_3$ and 0.71% chloride, by weight. Electron microscopic examination showed that the sol contained fibers of alumina monohydrate having the boehmite crystal lattice. This product appears as in Figure 3 of the drawings.

Titration of the sol thus obtained showed that it contained 15.6% unpolymerized alumina.

The aqueous dispersion was deionized from a pH of 2.46 to a pH of 5.5 with the bicarbonate form of a quaternary ammonium ion-exchange resin, "Nalcite SAR." The resin was regenerated first with sodium hydroxide and then with dry ice solution in order to convert it to the bicarbonate form for use in this deionization step.

For 2,000 grams of the fibrous boehmite alumina sol containing aluminum chloride as described above, a total of 554 grams of wet drained resin was required to deionize from a pH of 2.46 to a pH of 5.5.

A chemical analysis of the deionized sol showed that it contained 1.96% $Al_2O_3$ and 0.006% chloride, on the weight of the sol. This corresponds to an $Al_2O_3$:Cl ratio of 110.1. The amorphous alumina content of this sol, determined according to the methods described above, was 12.1%.

The sol obtained was slightly turbid but was stable. It showed intense streaming birefringence when examined between crossed "Polaroids."

In order to convert the remaining amorphous alumina to crystalline alumina monohydrate having the boehmite crystal lattice, the sol was heated under reflux for three hours. At the end of this time, the sol was still stable and still showed intense streaming birefringence between crossed "Polaroids," showing that the fibers were still homogeneously dispersed. Titration showed that the sol contained less than 1.5% unpolymerized alumina. Electron microscopic examination showed that the sol contained long fibers and no other crystalline shapes. X-ray and electron diffraction showed that alumina monohydrate having the boehmite crystal lattice was the only form of alumina present.

EXAMPLE 12

A concentrated basic aluminum chloride solution was prepared as in Example 11 and diluted to a concentration of about two percent $Al_2O_3$.

This dilute basic aluminum chloride solution was then autoclaved at 160° C. for one hour. The resulting product was a stable, opalescent sol which showed intense streaming birefringence between crossed "Polaroids" and had a pH of 3.78. Chemical analysis of this product shows it contained 2.14% $Al_2O_3$, 0.65% Cl which corresponds to an $Al_2O_3$:Cl mol ratio of 1.14:1. The amount of unpolymerized alumina present in this sol is determined by methods described above as 26.0% by weight of the total alumina. An electron micrograph at a magnification of 50,000 diameters showed that the sol contained fibrous boehmite alumina. This product appears at 25,000 diameters as in Figure 2 of the drawings, but is shorter.

The specific surface area of the fibrous boehmite in the sol was 392 m.$^2$/g. as determined by nitrogen absorption.

The sol obtained by autoclaving was deionized with an anion-exchange resin in the bicarbonate form, the resin being that used in Example 11. The sol was deionized from a pH of 3.78 to a pH of 5.51 using 445 grams of wet, drained anion exchanger.

Chemical analysis showed that the sol contained 1.86% $Al_2O_3$ and 0.06% Cl, by weight. This corresponds to a mol ratio $Al_2O_3$:Cl of 11:1. As determined by X-ray analysis of the sol only boehmite alumina was present. Determination of the amorphous alumina content by methods above showed that it contains 20.6% amorphous alumina.

The sol was stable and slightly opalescent. The specific surface area of the alumina in the sol was determined by nitrogen adsorption and was found to be 388 m.$^2$/g.

In order to convert the remaining unpolymerized alumina in the sol to crystalline alumina monohydrate having the boehmite crystal lattice, it was heated at 160° C. for one hour. The heat-up time from room temperature to 160° C. was 2.5 hours. The opalescent, stable sol after autoclaving exhibited streaming birefringence between crossed "Polaroids." The pH was 4.12. The specific surface area by nitrogen adsorption was 274 m.$^2$/g.

The unpolymerized alumina content was less than two percent. Electron micrographic examination of this sol showed that it was composed of fibers of boehmite alumina, and X-ray showed that only boehmite alumina was present.

EXAMPLE 13

A basic aluminum chloride solution of a type described above, that is, containing 24% $Al_2O_3$ and an $Al_2O_3$:Cl atomic ratio of 1:1 was used for this preparation. The solution was diluted down to 3% $Al_2O_3$ and 3,000 parts by weight of this water-clear solution was placed into a Pyrex autoclave reactor fitted with a spiral vented capillary top. The autoclave reactor was surrounded with water and the combination was heated up in 4 hours to 160° C. and held at that temperature for 3¾ hours. The autoclave and contents were then cooled to about 58° C.

After heating, the product was a semi-rigid gelatinous mass which readily liquified upon agitation, and became pourable. The sol showed flow birefringence between crossed "Polaroid" sheets and the electron micrographs at 50,000 diameters and 25,000 diameters showed that the micron long fibrous particles were slightly aggregated in a side-to-side fashion. The product appeared in an electron micrograph at 50,000 diameters as in Figure 2 of the drawings. An electron diffraction pattern of this dried down sol showed that alumina monohydrate having the boehmite crystal lattice was the alumina phase present. With X-ray diffraction, small particle-size alumina monohydrate having the boehmite crystal lattice was indicated with one extra line at 2.73 A. Titration of this sol for percent unpolymerized alumina yielded 19.2% while the pH was 3.18.

The turbidity of a 0.1% $Al_2O_3$ sol measured with a Fisher Electrophotometer using a 425B blue filter was 70.4% on the transmission scale. A silica analysis of the original sol showed that it contained only 53 parts per million of silica.

Flow birefringence measurements on the sol yielded a most frequent particle length, $L_f$, of 1200 millimicrons and a polydispersity, P, of 1.7 sq. millimicrons and a mean intrinsic particle anisotropy, $\bar{A}$, of $5.8 \times 10^{-2}$. Violent agitation of this sol in a "Waring Blendor" for 30 minutes reduced the apparent length of the particles to 670 millimicrons with a polydispersity of 1.5 sq. millimicrons and a mean particle anisotropy of about $5.5 \times 10^{-2}$. The acid depolymerization results were as follows:

Percent of nuclei=9.1, and thus
Corrected half-time of depolymerization, $\theta$ 160 min.

When this sol was air dried on a glass plate, at a thickness corresponding to about 5 milligrams $Al_2O_3$ per sq. centimeter, a coherent film was obtained.

Figure 4:
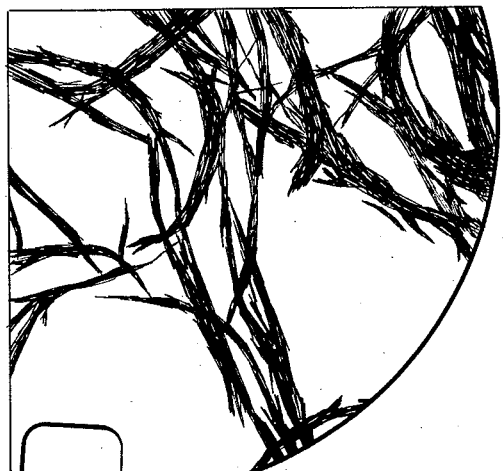
Figure 4 shows, at 18,000 diameters, a modified product prepared by azeotropically removing water from a product like that of Figure 2.

To determine the specific surface area of the dispersed phase, a portion of this dispersion was transferred azeotropically to normal-butanol and heated to 300° C. and vented as previously described. The dry white product contained 81.08% $Al_2O_3$, 1.56% chloride, and 5.2% carbon and had a nitrogen surface area of 318 m.$^2$/g. The number of butoxy groups per sq. millimicron of nitrogen surface area corresponds to 2.1. This dry product appeared in an electron micrograph as in Figure 4 of the drawings.

DEIONIZATION

A part of the sol prepared above was next freed of anions by gelling the sol with ammonium hydroxide to a pH of 10 and then washing with hot distilled water, adjusted to a pH of 10 with ammonia until the filtrate was free of chloride by the qualitative silver nitrate test. The filter cake after washing contained 15.7% $Al_2O_3$ and 0.005% Cl, corresponding to an $Al_2O_3$:Cl ratio of 350:1.

FREEZE DRYING OF THE DEIONIZED SOL

The filter cake obtained in the above washing procedure was next pulped with water to obtain a 5% dispersion of the alumina in water. This 5% sol was quick frozen in a Dry-Ice acetone bath by rapidly rotating a freeze drying flask containing the dispersion to obtain a thin frozen film of the alumina dispersion on the sides of the flask. After freeze drying overnight, the dried product was a very light, white, fluffy powder. It had a nitrogen specific surface area of 251 m.²/g. and contained 74.3% Al$_2$O$_3$ and had a bulk density at a pressure of 3 p.s.i. of 0.250 g./milliliter.

X-RAY ANALYSIS

Analysis of this freeze-dried material in a high temperature X-ray camera showed that alumina monohydrate having the boehmite crystal lattice was present at 25° C. and 200° C. but that at 400° C. a new phase began to appear with broad bands and these bands suggested the presence of kappa alumina. This new phase persisted at 600° C. and 900° C.

Further analysis of the X-ray diffractometer tracing for this sample at room temperature showed the following:

The exact "d" spacing corresponding to the 020 plane for this sample was 6.231. The line half-width and intensities of the stronger lines are given in the table below.

| "d" Spacing in Angstroms | Diffraction Line Half-Width in Degrees 2θ | Intensity I/I$_0$ |
| --- | --- | --- |
| 6.23 | 2.24 | 100 |
| 3.17 | 2.80 | 20 |
| 2.35 | 1.68 | 34 |
| 1.86 | 1.40 | 41 |
| 1.85 | 1.44 | 41 |
| 1.435 | 1.44 | 15 |
| 1.38 | 1.68 | 9 |

The intensity of the most intense line, at 6.23 A., of this pattern relative to the same line of a low surface area, well crystallized boehmite was 23:100. The half-width in degrees 2θ for some lines of a 5–20 micron fraction of alpha quartz on the same instrument were as follows:

4.27 angstroms, 0.20    3.48 angstroms, 0.20
2.46 angstroms, 0.25    1.82 angstroms, 0.20
1.54 angstroms, 0.30

STREAMING BIREFRINGENCE

A dispersion of this freeze-dried material made at 0.05% Al$_2$O$_3$ and a pH of 2 gave for a most frequent particle length, L$_f$, a value of 1400 millimicrons and a value for the polydispersity, P, of 7.8 square millimicrons, and a value for the mean intrinsic particle anisotropy, Ā, of $8.8 \times 10^{-2}$.

AIR-DRYING OF DEIONIZED CAKE

A part of the deionized cake was squeezed into noodles through a coarse screen having about 3/16" diameter holes, and these noodles air dried for 18 hours at 50° C. These dried, white noodles were quite hard and mechanically stable pellets which had a specific surface area of 253 m.²/g. and a percent Al$_2$O$_3$ of 75.25 with a loss on drying at 110° C. of 1.7%.

The quantitative flow birefringence measurements on a redispersion of this solid, pelleted material at 0.05% Al$_2$O$_3$ and a pH of 2 yielded a most frequent particle length of 750 millimicrons, a polydispersity of 2.0 sq. millimicrons and a mean intrinsic particle anisotropy of $6.8 \times 10^{-2}$. By comparing these flow birefringence measurements with the corresponding ones obtained on the original sol, it can be seen that a dispersion of these pellets was essentially equivalent to the dispersion obtained in the original sol which had been vigorously agitated in the "Waring Blendor."

DEIONIZED, BUTANOL-DRIED

Another portion of the deionized filter cake described above was azeotropically distilled with normal-butanol to remove the water. The butanol-alumina dispersion was dried under vacuum for 24 hours at 83° C. The dry, white, very friable, pulverulent product, had a specific surface area by nitrogen absorption of 280 m.²/g. Chemical analysis of this powder showed that it contained 71.7% Al$_2$O$_3$, 0.069% chloride, which corresponds to an Al$_2$O$_3$:Cl ratio of 361:1. The loss on drying at 110° C. of this sample was 0% and the percent carbon was 2.97, while the percent SiO$_2$ was 0.021. The number of butoxy groups per sq. millimicron of nitrogen surface area was 1.3. The electron micrograph of this powder at 50,000 diameters and 100,000 diameters looked about the same as the original material. A part of this sample was micropulverized through a screen having openings of .020 inch and the resulting product had a bulk density at 3 p.s.i. of 0.271 g./ml. and a specific surface area of 270 m.²/g.

This pulverulent white product was found to disperse readily in normal-butanol, as well as in water, to show flow birefringence between crossed "Polaroids."

A dispersion of this powder in water at 0.05% Al$_2$O$_3$ and a pH of 2 yielded flow birefringence results as follows:

For the most frequent particle length, L$_f$, a value of 1030 millimicrons, for the polydispersity, P, a value of 4 sq. millimicrons and for the mean intrinsic particle anisotropy, Ā, a value of $5.8 \times 10^{-2}$.

A similar type of dispersion made with the micropulverized product yielded a value for the most frequent particle length of 790 millimicrons, a value for the polydispersity of 1.7, and a value for the mean intrinsic particle anisotropy of $6.5 \times 10^{-2}$. It can be seen from these results that for the micropulverized product, the dispersion was essentially equivalent to that produced by air drying or by vigorous agitation of the original sol for 30 minutes in a "Waring Blendor."

A fibrous boehmite sol made by polymerizing a basic aluminum chloride solution by heating at 160° C. as above was gelled to a pH of 10, washed free of salt until the Al$_2$O$_3$:Cl ratio was 113:1, and the cake was repulped with distilled water and hydrochloric acid to 5% Al$_2$O$_3$ and Al$_2$O$_3$:Cl ratio of 43:1.

This sol was diluted with distilled water to 3% Al$_2$O$_3$ and sprayed uniformly onto a carpet which was a beige-colored, wool-rayon 50–50 blend, ¼ inch long, straight piled carpet. The sol was rubbed thoroughly into the pile and allowed to air-dry for 24 hours at 75° C. and 50% relative humidity. The treated dried carpet was then brushed-vacuumed thoroughly to remove excess alumina and to restore the pile to its original condition.

A control was prepared by spraying some of the same type of carpet with distilled water. The appearance of the two carpets was about the same but the carpet treated with alumina had a slightly harsher "hand" than the control. The treated carpet was much more resistant to soiling than the control and was more easily cleaned.

A smooth surface printing-stock paper and a rougher surface coating-stock paper were brush coated with a 3% Al$_2$O$_3$ sol prepared as just described. After air-drying, the treated papers were found more resistant to soiling than untreated controls. Soil which did adhere could readily be removed from the treated papers by dry wiping with a clean cloth or paper tissue.

EXAMPLE 14

A basic aluminum chloride solution was prepared from ether-extracted aluminum metal dust and aluminum chloride hexahydrate solution in the manner described previously; that is, 5 mols of aluminum metal dust were added to a solution 1 molar in aluminum chloride. This solution contained about 22% Al$_2$O$_3$ and an Al$_2$O$_3$:Cl ratio of 1:1.

This solution was diluted to 2% Al$_2$O$_3$ with distilled water and then heated in a Pyrex container set in an autoclave heated in one hour to 160° C. and held for 4 hours. The resulting product was a translucent, thixotropic, gel-like material, which electron microscope examination showed contained fibrous particles. The product appeared as in Figure 2 of the drawings. Vigorous agitation of this sol in a "Waring Blendor" for several minutes reduced the viscosity markedly.

A quaternary ammonium ion exchange resin, IRA–400, was transformed from the chloride to the hydroxide form with 10% sodium hydroxide and washed thoroughly with water and then the resin was converted to the bicarbonate form by slurrying in water and contacting it with an excess of Dry Ice immersed in the water. After this, the resin was filtered and drained.

A portion of the sol prepared above was deionized by using this bicarbonate ion exchange resin by slowly adding the resin while agitating and gently sparging with nitrogen gas until the pH of the sol reached 5.0–5.5. When examined between crossed Polaroids, it was found that the sol appeared to have various colors in it, even without shaking the sol. A small bottle of this sol, after standing overnight, was found to separate into two distinct layers with a very sharp line of demarcation between the layers. The top layer was birefringent only upon flow and therefore was dark between the crossed Polaroids when not agitated, but the bottom layer was permanently birefringent between crossed Polaroids. The fibrous alumina monohydrate having the boehmite crystal lattice in this bottom layer is herein called "para-crystalline" by analogy with fiber-like biological systems.

It was found that a small crystal of urea has a tendency to disorient the bottom oriented layer and that more of this bottom layer could be produced from top-layer material by evaporating the top layer above a concentration of about 2%. Upon further concentration of this sol, the entire sol was transformed to the para-crystalline material.

The behavior of these fibrous particles to produce this para-crystalline material is extremely interesting since it bears a striking resemblance to the behavior of tobacco mosaic virus and could therefore be considered as an inorganic physical anolog of that virus.

Water was removed from a fibrous boehmite alumina sol, prepared as above, by azeotropic distillation with N-butanol. The butanol was then removed by drying under vacuum at 80° C. to produce a fluffy, dry product. This product was added to tobacco at the rates of ½, 1, 2, 3, 4, 5, and 6% by weight based on the weight of tobacco. Cigarettes prepared from the tobacco thus treated were improved in taste and mildness, as reported by a number of observers. The smoke was found to contain less tar than an untreated control. When the tobacco was used for pipe tobacco the pipe bowl was found to be cleaner and dryer than when used with an untreated control tobacco.

EXAMPLE 15

A basic aluminum chloride containing 24% $Al_2O_3$ and having a $Al_2O_3$:Cl ratio of 1:1 and a $\theta$ value under one minute was diluted to 3% $Al_2O_3$ with distilled water. This was heated in a Pyrex vessel for 4 hours at 160° C. It was then cooled and discharged.

The sol produced was opalescent and showed flow birefringence. When the sol was diluted to 0.1% $Al_2O_3$ the turbidity measured with a Fisher electrophotometer using a 425B filter showed a percent transmission of 76.

A quantitative flow birefringence measurement on this sol showed that the particles had a most frequent particle length, $L_f$, of 610 millimicrons with a poly-dispersity, P, of 1 square millimicrons, and an $\bar{A}$ of $6.7 \times 10^{-2}$.

I have noted that even when the starting materials have the same $Al_2O_3$:Cl ratio and the same value for $\theta$, and even when the processes are otherwise the same, the products obtained may differ considerably. Considerable product variation seems to result from differences in the starting material which are quite difficult to define and it is thought that these differences may reside in the amount of anisometric material, possibly of a fibrous character, in the original basic aluminum chloride or other starting material. The starting material used above was water-clear upon visual examination, but at very high gradients a very slight amount of birefringence was observed. Thus at a gradient of 7000 reciprocal seconds the solution showed a streaming birefringence of $19.4 \times 10^{-7}$ and it had a viscosity at 30° C. of 44.8 centipoises.

A basic aluminum chloride solution otherwise identical to that used above but having a birefringence at 7000 reciprocal seconds of $7.3 \times 10^{-7}$ and a lower viscosity, of 22.0 centipoises at 32° C., was treated as above. After autoclaving a 3% solution for 4 hours at 160° as above, the sol obtained was more turbid, 31 percent transmission, thixotropic, viscous, and exhibited much stronger flow birefringence. The most frequent particle length of the particles in this sol was about 1100 millimicrons with a polydispersity of 0.08 square millimicron and an $\bar{A}$ factor of $6.7 \times 10^{-2}$.

EXAMPLE 16

13.1 parts by weight of a commercial gelatinous aluminum hydroxide containing 16.42% alumina, less than 0.01% chloride, $\theta$ under one minute, and a loss on ignition of 84.63% was combined with 20 parts by weight of 1.011 N hydrochloric acid and diluted up to 100 parts by weight. This solution was made up to contain 1% $Al_2O_3$ and an $Al_2O_3$:Cl ratio of 1:1. After homogenizing this mixture, it was placed into a Pyrex vessel and heated for 16 hours at 160° C. After heating the turbid, viscous, and slightly thixotropic sol exhibited streaming birefringence. The pH of this dispersion was 3.16. An electron micrograph of this product was similar to that shown in Figure 2.

In the same way and using equivalent molar amounts, sols of similar character can be prepared with iodic, trichloroacetic, perchloric, and hydrobromic acid radicals instead of hydrochloric.

It is further noted that the dispersion can be agitated during the heating period to produce a sol which is somewhat less viscous and more homogeneous than that prepared as above.

EXAMPLE 17

An alumina sol prepared as in Example 14 was used as a starting material. 100 parts by weight of alumina sol containing 2.25% $Al_2O_3$ and 0.338 part by weight of soluble alumina was mixed vigorously for 10 minutes with 1.912 parts by weight of alumina in the form of very soluble gelatinous aluminum hydroxide. This gelatinous aluminum hydroxide was added as a slurry which contained 16.42% $Al_2O_3$ and a total of 11.65 parts by weight of this gel was used. The pH of this mixture was 4.2.

The mixture was placed into a Pyrex vessel, sealed, and heated at 160° C. for 16 hours. After heating, the product was found to be a pasty sol which showed streaming birefringence. An electron micrograph of this sol at 50,000 diameters is shown in Figure 3.

EXAMPLE 18

(a) *Undeionized sol.*—383 parts by weight of a basic aluminum chloride solution containing 23.5% $Al_2O_3$ and sufficient chloride to yield an $Al_2O_3$:Cl=1.1 ratio was diluted to a total of 3000 parts by weight using distilled water. This solution contained 3% $Al_2O_3$ and $\theta$ was less than one minute.

This water-clear solution was autoclaved in a Pyrex container at 160° C. for 16 hours. The product was an opaque, white, semirigid, gelatinous mass which readily liquified upon agitation. Titration of a sample of this sol yielded 17.0% unpolymerized alumina. The turbidity, percent transmission, at 0.1% $Al_2O_3$ using a 425B filter in a Fisher electrophotometer was 44.0.

This sol at 50,000 diameters appeared quite similar to that shown in Figure 3.

X-ray examination of a room-temperature dried sample of this sol showed that it contained alumina monohydrate having the boehmite crystal lattice plus 2 extra diffraction lines as 2.75 A. and 3.88 A.

Streaming birefringence measurements on this sol diluted to 0.05% $Al_2O_3$ and adjusted to a pH of 2.0 yielded a most frequent particle length, $L_f$, of 1670 millimicrons and a polydispersity, P, of 19.2 square millimicrons. This same sol after agitating in a Waring Blendor for 30 minutes yielded a most frequent particle length of 900 millimicrons and a polydispersity of 0.4 square millimicron and a mean intrinsic particle anisotropy, $\bar{A}$ of $5.5 \times 10^{-2}$.

The half-time of depolymerization, $\theta$, of this sample was 280 minutes.

(b) *Undeionized sol vented.*—The alumina sol prepared as described above was next azeotropically transferred to n-butanol and then heated to 300° C. in an autoclave and the autoclave vented. After venting, the white, fluffy powder was vacuum dried for 16 hours at 80° C. This sample, by chemical analysis, was found to contain 77.81% $Al_2O_3$, 0.61% chloride, and 2.43% carbon. The $Al_2O_3$:Cl ratio of this product is 64:1. The nitrogen surface area of this product was 198 m.²/g., which corresponds to 1.5 butoxy groups/square millimicron of nitrogen surface area.

This powder was found to disperse in water as well as in n-butanol or other polar organic solvents. In water, flow birefringence results at 0.05% $Al_2O_3$ yielded a most frequent particle length of 1365 millimicrons and a polydispersity of 17.3 square millimicrons and a mean intrinsic particle anisotropy of $3 \times 10^{-2}$.

(c) *Deionized sol.*—A portion of the undeionized sol was gelled at pH 10 with aqueous ammonia solution and this gel was then filtered and washed at 80° C. with distilled water which had been adjusted to a pH of 10 with ammonium hydroxide until there was no chloride in the filtrate by a silver nitrate solution test.

The product was washed with distilled water. The deionized cake contained 20.13% $Al_2O_3$ and 0.02% chloride, which corresponds to an $Al_2O_3$:Cl ratio of 350:1.

Repulping of this deionized cake in water yielded a sol which showed excellent streaming birefringence.

(d) *Deionized sol vented.*—A portion of the deionized cake was azeotropically transferred to n-butanol and then heated in an autoclave to 300° C. and vented. The alumina-butanol dispersion appeared to be a rather stable organosol which showed streaming birefringence. The white, fluffy powder from the autoclave was dried at 84° C. in a vacuum oven for 24 hours.

Electron microscopic examination of this product showed that it was substantially unchanged from the original undeionized sol. Chemical analysis of this white, fluffy powder yielded 77.70% $Al_2O_3$, 0.072% chloride, which corresponds to an $Al_2O_3$:Cl ratio of 375:1. In addition, the loss on drying at 110° C. was 2.11 and the percent carbon was 2.21. The percent carbon corresponds to 1.3 butoxy groups/square millimicron of surface area. The bulk density of this powder at 3 p.s.i. was 0.125.

(e) *Deionized product dried from butanol.*—A portion of the deionized cake which had been previously transferred to n-butanol was used as the starting material in this preparation. This organosol was placed in a tray and then into a vacuum oven at 80° C. and dried for 24 hours. The white, pulverulent solid was removed and found to have a nitrogen specific surface area of 197 square meters/grams. Chemical analysis of this powder showed that it contained 75.81% $Al_2O_3$, 0.12% chloride, which corresponds to an $Al_2O_3$:Cl ratio of 220:1. The loss on drying at 110° C. was 0.0% while the percent carbon was 2.62%. The percent carbon corresponds to 1.7 butoxy groups/square millimicron of nitrogen surface area. Electron microscopic examination of this powder showed that its particles were quite similar to those of the original sol.

Redispersion of this powder in water at a concentration of 0.05% $Al_2O_3$ yielded a sol which had a turbidity at a pH of 3.5 of 42 using a 425B filter on a Fisher electrophotometer. A dispersion of the unmicropulverized powder in water at 0.05% $Al_2O_3$ and a pH of 2 yielded a most frequent particle length of 1520 millimicrons and a polydispersity of 9.70 square millimicrons. A redispersion of the micropulverized powder yielded a most frequent particle length of 1254 millimicrons and a polydispersity of 5.4.

A portion of this powder was micropulverized through a screen containing openings of 0.02 inch. The bulk density of this micropulverized powder at a pressure of 3 p.s.i. was 0.040 g./milliliter. The specific surface area of this powder was 200 m.²/g. Electron microscopic examination of this powder at 50,000 diameters showed that it did not appear changed from the powder before micropulverization.

(f) *Deionized product air dried from water.*—A portion of the deionized cake prepared above was squeezed through a coarse screen to form noodles of about ¼" in diameter. These noodles were then oven dried at 50° C. in a circulating air oven.

These noodles which were broken up into pellets were mechanically quite strong and can be used as catalysts in vapor phase dehydrogenation of alcohols. The specific surface area of this product was 196 m.²/g. Chemical analysis showed that it contained 76.32% $Al_2O_3$ and a loss on drying at 110° C. of 0.0%.

These pellets, although quite hard, can readily be softened in water, acidified with an acid, to obtain a good redispersion. Quantitative flow birefringence on such a dispersion made up to contain 0.05% $Al_2O_3$ yielded a most frequent particle length of 1135 millimicrons and a polydispersity of 4.1 square millimicrons and a mean intrinsic particle anisotropy of $6.6 \times 10^{-2}$.

(g) *Deionized sol freeze dried.*—A portion of the deionized cake prepared above was redispersed in water so as to make a dispersion containing 5% $Al_2O_3$ by using 37.3 parts by weight of deionized cake and making it up to 150 parts by weight with distilled water. Since this dispersion was still somewhat viscous, another 100 parts by weight of water were added to bring the percent alumina to 3%.

This dispersion was then quick-frozen in an acetone Dry-Ice bath by rapidly rotating the flask containing this dispersion to produce a thin film of the frozen material on the sides of the flask. After freeze drying of this sample using a high vacuum pump, the white, fluffy powder produced had a surface area of about 200 m.²/g., specifically 193 m.²/g. and a bulk density at 3 p.s.i. of 0.303 g./milliliter. The percent alumina of this powder was 79.01%. An infrared spectrum of this powder is shown in Figure 5. A redispersion of this powder in water at 0.05% $Al_2O_3$ yielded a most frequent particle length of 1408 millimicrons and a polydispersity of 7.8 square millimicrons.

X-ray analysis of this sample using a diffractometer yielded the results given in the attached table. The products of Examples 13 and 14 are also shown.

EXAMPLE 19

120 parts of aluminum nitrate ($Al(NO_3)_3 \cdot 9H_2O$) were heated for 8 hours at 290–330° C. and 2 hours at 380–420° C. This intermediate is a white, free-flowing powder having an $Al_2O_3$:$NO_3$ ratio of 3.6:1. The value of $\theta$ was 3 minutes. This was slurried in water to form a mixture containing 5.85% $Al_2O_3$ and autoclaved for 4 hours at 160° C. The product is an opalescent sol, exhibiting strong streaming birefringence. The sol had a pH of 3.3, containing 0.64% $NO_3$, 5.85% $Al_2O_3$, and 4.3% unpolymerized alumina. The value of $\theta$ was 163 minutes and the surface area was 320 m.²/g. Electron micrographs show that it contains fine fibers of alumina about 400 millimicrons long and an axial ratio of about 100:1. The sol dries down to a hard, abrasion resistant film with fair water resistance. The fibers are alumina monohydrate having the boehmite crystal lattice.

| ASTM 2-0129 | | Example 14—Para-Crystal | | Example 18 (g)—Freeze Dried | | | Example 13—Freeze Dried | | |
|---|---|---|---|---|---|---|---|---|---|
| "d" in Ang. | I/I₀ | "d" in Ang. | I/I₀ | "d" in Ang. | I/I₀ | Half-widths in degrees | "d" in Ang. | I/I₀ | Half-widths in degrees |
| 6.20 | 100 | 6.18 | 100 | 6.19 | 100 | 1.16 | 6.21 | 100 | 2.24 |
| 3.17 | 100 | 3.173 | 100 | 3.17 | 33 | 1.28 | 3.09 | 20 | 2.80 |
| 2.34 | 100 | 2.347 | 100 | 2.35 | 26 | 0.960 | 2.34 | 34 | 1.68 |
| 1.98 | 60 | 1.987 | 50 | | | | | | |
| 1.86 | 100 | 1.87 | 50 | 1.86 | 33 | 1.28 | 1.87 | 41 | 1.40 |
| | | 1.85 | 80 | | | | 1.85 | 41 | 1.44 |
| 1.77 | 60 | 1.769 | 50 | 1.78 | 4 | 1.44 | | | |
| 1.66 | 70 | 1.661 | 50 | 1.66 | 7 | 1.20 | | | |
| 1.53 | 60 | 1.530 | 40 | 1.53 | 5 | 1.36 | | | |
| 1.45 | 60 | 1.453 | 60 | 1.45 | 6 | 1.16 | | | |
| 1.43 | 60 | 1.435 | 60 | 1.44 | 7 | 1.12 | 1.435 | 15 | 1.44 |
| | | 1.396 | 50 | | | | | | |
| 1.38 | 70 | 1.382 | 50 | 1.38 | 10 | 1.20 | 1.38 | 9 | 1.68 |
| 1.31 | 80 | 1.310 | 80 | | | | | | |
| 1.22 | 20 | 1.226 | 20 | | | | | | |
| 1.21 | 40 | 1.206 | 40 | | | | | | |
| 1.18 | 60 | 1.179 | 40 | | | | | | |
| 1.16 | 60 | 1.160 | 40 | | | | | | |
| 1.13 | 70 | 1.135 | 60 | | | | | | |
| 1.11 | 60 | 1.114 | 40 | | | | | | |
| 1.09 | 30 | 1.089 | 20 | | | | | | |
| 1.05 | 60 | 1.046 | 40 | | | | | | |
| 1.03 | 50 | 1.027 | 40 | | | | | | |
| 1.02 | 40 | | | | | | | | |
| 0.988 | 20 | | | | | | | | |
| 0.980 | 40 | | | | | | | | |
| 0.949 | 60 | 0.9521 | 60 | | | | | | |
| 0.929 | 50 | 0.9329 | 60 | | | | | | |
| 0.923 | 60 | 0.9248 | 60 | | | | | | |
| 0.913 | 30 | 0.9133 | 60 | | | | | | |
| 0.910 | 60 | | | | | | | | |
| 0.901 | 60 | 0.9024 | 60 | | | | | | |
| | | 0.8908 | 60 | | | | | | |
| | | 0.8319 | 60 | | | | | | |
| | | 0.8276 | 60 | | | | | | |
| | | 0.8023 | 60 | | | | | | |
| | | 0.7768 | 40 | | | | | | |

EXAMPLE 20

Aluminum nitrate $(Al(NO_3)_3 \cdot 9H_2O)$ was heated for 6 hours at 275–300° C. and 5 hours at 320° C. This intermediate is a white, free-flowing powder containing an $Al_2O_3:NO_3$ ratio of 3.3:1 and having a value of $\theta$ of 2 minutes. This was slurried in water to form a mixture containing 5.86% $Al_2O_3$ and autoclaved for 3 hours at 180° C. The product is an opalescent sol, exhibiting streaming birefringence. The sol had a pH of 3.1, contained 1.04% $NO_3$, 5.86% $Al_2O_3$, and 4.6% unpolymerized alumina. The value of $\theta$ was 172 minutes. Electron micrographs show that it contains fine fibers of about 350 millimicrons long with a surface area of 310 m.²/g. and an axial ratio of about 85:1. The fibers are alumina monohydrate having the boehmite crystal lattice. The sol dries down to a hard, coherent film with fair water resistance.

EXAMPLE 21

Aluminum chloride hexahydrate $(AlCl_3 \cdot 6H_2O)$ was heated in a muffle furnace for 4 hours at 300° C. This intermediate is a hard cake which was easily ground to a fine powder. It had an $Al_2O_3:Cl$ ratio of 1.15:1. It had a value of $\theta$ of 1 minute. This powder was slurried in water to give an $Al_2O_3$ concentration of 3% and autoclaved for 3 hours at 160° C. The product is an opalescent sol showing strong streaming birefringence, and containing fibrous alumina about 500 millimicrons long as indicated by electron micrographs and having an axial ratio of about 100:1. The value of $\theta$ is 180 minutes. The product is alumina monohydrate having the boehmite crystal lattice.

EXAMPLE 22

270 parts by weight of sodium aluminate (44% $Al_2O_3$) dissolved in 1000 parts by weight of distilled water and 1000 parts by weight of 18% $HNO_3$ solution were added simultaneously to a heel of 1000 parts by weight of water at such rates that the pH of the heel is maintained at 5–7. The addition required 20 minutes and the temperature rose from 27 to 43° C. The precipitate was filtered and washed free of excess nitrate anions. It had a $\theta$ value of less than one minute. The cake was diluted with water to an $Al_2O_3$ concentration of 5.38% and autoclaved for 3.5 hours at 160° C.

The sol product was opalescent, thixotropic, and strongly birefringent under flow. The following analyses were obtained on the sol—pH 3.68, 5.38% $Al_2O_3$, 1.46% $NO_3$ ($Al_2O_3:NO_3=2.25:1$), 8.5% unpolymerized alumina, 0.01% Na, fiber length by electron micrograph 400 millimicrons and an axial ratio of about 100:1.

Part of the sol was deionized by the addition of Nalcite HCR resin in the hydrogen form and Amberlite IRA–400 in the bicarbonate form. The resin was screened off, giving a sol of pH 4.1, specific resistance of 930 ohms/cm., 2.0% unpolymerized alumina, $\theta=120$ minutes, and fiber length and ratio unchanged. The value of $L_f$ as measured by streaming birefringence was 386 millimicrons. A sample of the sol was dried in a vacuum oven at 100° C. and had a surface area by nitrogen absorption of 346 m.²/g. The sol dried down to a hard, coherent film on a glass plate. When an amount of this sol was added to a slurry of glass fibers to give an $Al_2O_3$:glass weight ratio of 1:5 and processed to a paper in standard paper making equipment, the resulting paper had a tensile strength three times that of a similar paper containing no fibrous boehmite alumina.

Part of the sol was gelled by the addition of dilute ammonium hydroxide to a pH of 8.0 and dried for 4.5 hours at 225–250° C. The lumpy product could be easily ground to a white, free-flowing dry powder. This powder was readily dispersed in water to form an opalescent sol containing 3% $Al_2O_3$ and 0.08% $NO_3$. The sol was dried on a glass plate to form a hard, coherent, abrasion resistant film.

EXAMPLE 23

Aluminum nitrate $(Al(NO_3)_3 \cdot 9H_2O)$ was heated for 8 hours at 275° C. The white product was micropulverized to a fine white powder. This intermediate contained an $Al_2O_3:NO_3$ ratio of 1.6:1 and had a $\theta$ value of one minute. Water was added to this powder to form a slurry containing 8.7% $Al_2O_3$. It was then autoclaved at 160° C. for 3 hours.

The product discharged from the autoclave is an opalescent sol showing strong streaming birefringence. The following analyses were obtained on the sol: pH 2.9, 8.7% alumina, 3.4% $NO_3$ ($Al_2O_3$:$NO_3$ ratio 1.55:1), 15% unpolymerized alumina, fiber length by electron micrograph 500 millimicrons, and an axial ratio of about 110:1. The product appeared as in Figure 11. In this figure, as in some before and in the three following, an insert shows by a line drawing about what can be seen in the original plate from which the remainder of the figure was made. A few individual fibers can be seen as at 1 but most of the fibers are aggregated into fiber-like bundles 2.

Part of this sol was deionized by the addition of Nalcite HCR resin in the hydrogen form and Amberlite IRA–400 resin in the bicarbonate form and stirring at room temperature. The resin was screened off to give an opalescent sol of the following properties: pH 6.5, specific resistance 3600 ohms/cm., $\theta$=178 minutes, 6.8% unpolymerized alumina and a surface area of 278 m.$^2$/g. by nitrogen absorption measured on a sample dried in a vacuum oven at 100° C. The value of $L_f$ measured by streaming birefringence is 562 millimicrons.

The sol was dried down on a glass plate to form a clear, coherent, hard, abrasion resistant, water resistant film. When an amount of this sol was added to a slurry of glass fibers to give an $Al_2O_3$:glass weight ratio of 1:5 and formed into a paper on standard paper making equipment, the resulting paper had a tensile strength four times that of a control containing no fibrous alumina.

Part of the above sol was gelled by the addition of dilute ammonium hydroxide to a pH of 8.3 and dried for 12 hours at 180° C. The product is a lumpy solid which could be easily micropulverized. The resulting white, free-flowing dry powder was easily dispersible in water to form a sol containing 2.1% alumina, .15% nitrate. The sol was dried down on a glass plate to form a hard, coherent, abrasion resistant film.

EXAMPLE 24

1171 parts by weight of aluminum nitrate

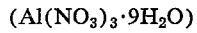

$(Al(NO_3)_3 \cdot 9H_2O)$ were heated for 12 hours at 280° C. and the lumpy product was micropulverized. By analysis this product contained an $Al_2O_3$:$NO_3$ ratio of 2.8:1 and had a $\theta$ value of 2 minutes. It was slurried in water to give a concentration of 8.4% $Al_2O_3$ and autoclaved for 3 hours at 160° C.

The product discharged from the autoclave was an opalescent, thixotropic sol with the following analyses: pH 3.4, 8.4% $Al_2O_3$, 1.9% $NO_3$, $Al_2O_3$:$NO_3$ ratio of 2.7:1, 5.8% unpolymerized alumina, strong streaming birefringence, a fiber length of about 600 millimicrons and an axial ratio of 25:1 by electron micrographs, and $L_f$=610 millimicrons.

This sol was deionized by the addition of Nalcite HCR resin in the hydrogen form and Amberlite IRA–400 resin in the bicarbonate form and stirred at room temperature. The resin was screened off to give an opalescent sol of pH 4.1, specific resistance of 500 ohms/cm. and containing 5.46% $Al_2O_3$, .024% nitrate, 2.79% unpolymerized alumina, $\theta$=105 minutes. On drying down on a glass plate, this deionized sol gave a clear, coherent film.

This product is shown in Figure 12. A few individual fibrils can be seen as at 1 but most of the fibrils are aggregated into fiber-like bundles 2.

EXAMPLE 25

50 parts by weight of aluminum sulfate

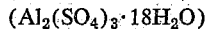

$(Al_2(SO_4)_3 \cdot 18H_2O)$ dissolved in 100 parts of water and 34 parts of sodium carbonate dissolved in 408 parts of water were added simultaneously to a heel of 120 parts of distilled water at such a rate that the pH of the heel was maintained at 6.7±0.2. The addition required a total of 15 minutes. The resulting slurry was filtered and washed with 10 bed volumes of distilled water to remove the sodium sulfate. The cake was reslurried in water and heated to boiling to remove absorbed $CO_2$ and the aluminum hydroxide again separated by filtration. The resulting cake contained 7.3% $Al_2O_3$, 0.027% carbonate, 0.2% sulfate, 0.002% sodium. The $\theta$ value of this alumina was less than one minute.

Six parts of distilled water and 0.75 part of 70% nitric acid were added to 20 parts of the above filter cake containing aluminum hydroxide. The resulting slurry was autoclaved for three hours at 150° C. The $Al_2O_3$:$NO_3$ ratio in this slurry is 2.5:1. The product discharged from the autoclave is an opalescent, thixotropic sol which shows strong streaming birefringence. The electron micrographs indicate the sol contains fibrous alumina about 400 millimicrons long. The fibers are alumina monohydrate having the boehmite crystal lattice. The alumina sol contains 6.6% unpolymerized alumina and has a $\theta$ value of 130 minutes. The axial ratio of the fibers is 20:1. When the sol is cast on a glass plate and dried at 100° C., it forms a clear, coherent, hard film.

EXAMPLE 26

A sample of aluminum nitrate $(Al(NO_3)_3 \cdot 9H_2O)$ was heated for 6 hours at 275° C. and subsequently ground to obtain a white residue having an $Al_2O_3$:$NO_3$ ratio of 1.26 and a $\theta$ value of 1 minute. This powder was slurried in water to give an $Al_2O_3$ concentration of 5.4% and autoclaved for 3 hours at 160° C. The product discharged from the autoclave contained 5.4% $Al_2O_3$, 2.6% $NO_3$, 13% unpolymerized alumina, had a pH of 3.2, $L_f$=1085, and a $\theta$ value of 151 minutes. The fibrous alumina monohydrate exhibited strong streaming birefringence and had a fiber length of about 1000 millimicrons and an axial ratio of about 280:1 as indicated by electron micrographs. The product of this example is shown in Figure 13. It will be seen that the product contains a number of individual fibrils 1 but that there is some aggregation of fibrils into bundles of two, three, or more as at 3.

EXAMPLE 27

A sample of aluminum nitrate $(Al(NO_3)_3 \cdot 9H_2O)$ was heated for 7 hours at 275° C. and subsequently ground to obtain a white powder having an $Al_2O_3$:$NO_3$ ratio of 1.45 and a $\theta$ value of 1 minute. This powder was slurried in water to give an $Al_2O_3$ concentration of 2.4% and autoclaved for 4 hours at 160° C. The product discharged from the autoclave contained 2.4% $Al_2O_3$, 1.2% $NO_3$, 15.8% unpolymerized alumina, had a pH of 1.8 and a $\theta$ value of 182 minutes. The fibrous alumina monohydrate exhibited strong streaming birefringence and had a fiber length of about 500 millimicrons and an axial ratio of 30 as indicated by electron micrographs. The product is shown in Figure 14 in which it will be seen that the alumina fibrils 1 are only very slightly aggregated.

EXAMPLE 28

It is observed that a fully deionized sol prepared as in Example 11 will form a solid gel within about 1 day if the pH of the resultant deionized sol is between 5.5 and 6.5. However, if acetic acid is added to lower this pH to a value of about 4.5, a stable sol can be produced. This resultant sol is stable over a period of 6 months or more. In a like manner, formic acid, propionic acid, hydriodic acid, hydrobromic acid, nitric acid and perchloric acid can be used to stabilize these deionized sols. The amount of these acids added is small and only sufficient amounts are required to bring the pH to about 4.5.

EXAMPLE 29

1456 parts by weight of $Al(NO_3)_3 \cdot 9H_2O$ were heated 7½ hours at 300° C. driving off water and nitric acid.

317 parts by weight of product were recovered which analyzed as follows:

Percent $Al_2O_3$ ---- 59.1.
Percent $NO_3^-$ ---- 24.6.
Specific surface area ---- 67 m.$^2$/g.

A charge of 178 parts by weight of the above product and 3320 parts by weight of distilled water was autoclaved in a steam-jacketed stirred reactor for six hours at 160° C. The resulting sol analyzed as follows:

pH ---- 2.1.
Percent $Al_2O_3$ ---- 2.36.
Specific surface area ---- 294 m.$^2$/g.

The above product was deionized by adding a mixture of 200 parts by weight of the product and 100 parts by weight of water to a mixture of 28 parts by weight of Amberlite IR-120 resin (H$^+$ form) and 16 parts by weight Amberlite IRA-400 ($HCO_3^-$ form). The mixture was agitated for one-half hour and then filtered. The procedure was repeated and the filtered product, a clear sol, analyzed as follows:

pH ---- 5.2
Percent $Al_2O_3$ ---- 1.40
Percent $NO_3^-$ ---- 0.028

Average fibril length as determined by the above described spray-mist technique=442 millimicrons.

In the sol, and of course in the final product, the alumina was present as fibrous alumina monohydrate.

EXAMPLE 30

1045 parts by weight of $Al(NO_3)_3 \cdot 9H_2O$ were heated four hours at 300° C. and gave a product which analyzed 64.8% $Al_2O_3$ and 22.5% $NO_3^-$. 162 parts by weight of this product were mixed with 3340 parts by weight of water and autoclaved for three hours at 160° C. in a stirred autoclave. 300 parts by weight of the resulting sol were deionized by adding to a mixture of 21 parts by weight of a polystyrene nuclear sulfonic acid resin, Amberlite IR-120 resin (H$^+$ form) and 12 parts by weight of a polystyrene quaternary amine resin, Amberlite IRA-400, resin ($HCO_3^-$ form), agitating for one-half hour and then filtering. The above step was repeated and finally two parts by weight of Amberlite IRA-400 were added and the mixture stirred for one minute and filtered. The resulting sol consisted of fibrous alumina monohydrate with an average fibril length as determined by the spray-mist technique of 296 millimicrons.

EXAMPLE 31

Products of this invention were also prepared by precipitating a basic aluminum carbonate gel from alum and sodium carbonate, washing to a definite purity level, subsequently autoclaving in the presence of dilute acetic or formic acid. The formation of products by this process are described in detail in the copending application above cited. The sol products obtained when a basic aluminum carbonate gel was autoclaved at 160° C. for one hour in the presence of dilute acetic acid:

Percent $Al_2O_3$ ---- 4.93.
Percent $CH_3COOH$ ---- 7.15.
Specific surface area ---- 291 m.$^2$/g.
$L_f$ ---- 397 millimicrons.

Average fibril length as determined by the spray-mist technique=408 millimicrons.

In the sol, and of course in the final product, the alumina was present as fibrous alumina monohydrate.

EXAMPLE 32

An alumina gel was precipitated by simultaneously metering an alum solution containing 1 part $$Al_2(SO_4)_3 \cdot 18H_2O$$

and 2 parts distilled water and a sodium carbonate solution containing 1 part $Na_2CO_3$ and 4 parts distilled water into the agitated reaction mass in an open tank. The reactant ratio, $CO_2/Al$, was maintained at 1.67±0.02 (molar basis) at all times during the precipitation. After precipitation the gel slurry was transferred to a filter nutsche and filtered using vacuum. The filter cake was washed on the nutsche using nine succesisve washes of distilled water at 70° C. Each wash volume was approximately equivalent to the volume of the filter cake. Thirty-eight parts of washed cake was transferred to a stirred kettle and mixed with 10.2 parts distilled water. This mixture was homogenized by pumping it through a centrifugal pump four times. This homogenized slurry analyzed as:

Percent $Al_2O_3$ ---- 7.94
Percent Na ---- 0.010
Percent $SO_4$ ---- 0.054

Two thousand two hundred parts of this slurry was aged for 24 hours at 25° C. and then mixed with 1218 parts distilled water and 82.4 parts glacial acetic acid. This mixture was placed in a flask equipped with a paddle agitator and heated to boiling (100° C.) and held at reflux for 5 minutes to drive off carbon dioxide. This reaction mix was then transferred to a stainless steel autoclave equipped with an agitator and heated to 160° C. in a period of 24 minutes. Temperature was maintained at 160° C. for one hour and then the charge was cooled to 70° C. in 10 minutes and discharged from the autoclave. This material, a translucent, fluid sol analyzed as follows:

Percent $Al_2O_3$ ---- 4.96
Percent $CH_3COOH$ ---- 2.40

The fibrous alumina monohydrate fibers possessed the following properties:

Specific surface area ---- 301 m.$^2$/g.
$L_f$ ---- 279 millimicrons.

EXAMPLE 33

Dry, free-flowing, redispersible powders were prepared from aquasols made as in Example 32 by spray-drying. A translucent sol which analyzed as follows was spray dried:

Percent $Al_2O_3$ ---- 5.05.
Percent $CH_3COOH$ ---- 2.37.
$L_f$ ---- 287 millimicrons.
Specific surface area ---- 307 m.$^2$/g.

Average fibril length as determined by the spray-mist technique=280 millimicrons.

The pulverulent, dry product was free-flowing, 100% dispersible in water, and analyzed as follows:

Percent $Al_2O_3$ ---- 72.2.
Percent $CH_3COOH$ ---- 8.0.
$L_f$ ---- 277 millimicrons.
Specific surface area ---- 281 m.$^2$/g.
$\theta$ ---- 80.

Average fibril length as determined by the spray-mist technique=110 millimicrons.

In the sol, and of course in the final product, the alumina was present as fibrous alumina monohydrate.

A dry product prepared as above was used to reinforce foam rubber in the manner described below.

Fibrous boehmite (69.2% $Al_2O_3$, 9.49% acetic acid, surface area=297 m.$^2$/g., $L_f$ 348 millimicrons) was dispersed in distilled water to form baths in the concentration range 0.1% to 0.4% solids.

Commercially produced Talalay process foam, made from a blend of natural rubber and GR-S (butadiene-styrene) latices was cut in foot square test pieces which were dip treated in one case in distilled water and other cases in the boehmite dispersions by submersing them, squeezing repeatedly under the liquid surface and then passing through wringer rolls to remove excess sol. The treated foam samples were dried in a circulating air oven at 120° C. for 45 minutes, allowed to equilibrate in the laboratory for 24 hours before testing in accordance with ASTM D1055-56T.

After fatigue exposure of all foam samples by flexing them 250,000 times to 50% of their original height, the load bearing capacity of the treated samples was found to be greatly increased in comparison with the untreated foam and to vary in proportion to the boehmite content found on the foam by analysis, as follows:

| Percent Boehmite Solids on Foam (by analysis) | Percent Increase in Load Bearing Capacity Over Untreated Control for Foam of Absolute Density, 0.075 g./cc. When Loaded to 50% Deflection |
|---|---|
| 0.6 | 40 |
| 0.9 | 48 |
| 1.1 | 73 |
| 1.5 | 95 |
| 3.1 | 121 |

EXAMPLE 34

An alumina gel was precipitated by simultaneously metering an alum solution containing 1 part $$Al_2(SO_4)_3 \cdot 18H_2O$$

and 2 parts distilled water and a sodium carbonate solution containing 1 part $Na_2CO_3$ and 4 parts distilled water into the agitated reaction mass in an open tank. The reactant ratio, $CO_2/Al$, was maintained at 1.67±0.02 (molar basis) at all times during the precipitation. After precipitation the gel slurry was transferred to a filter nutsche and filtered using vacuum. The filter cake was washed on the nutsche using nine successive washes of distilled water at 70° C. Each wash volume was approximately equivalent to the volume of the filter cake. Thirty-eight parts of washed cake was transferred to a stirred kettle and mixed with 10.2 parts distilled water. This mixture was homogenized by pumping it through a centrifugal pump four times. This homogenized slurry analyzed as:

Percent $Al_2O_3$ _____ 7.94
Percent Na _____ 0.010
Percent $SO_4$ _____ 0.054

Two thousand two hundred parts of this slurry was aged for 24 hours at 25° C. and then mixed with 1218 parts distilled water and 82.4 parts glacial acetic acid. This mixture was placed in a flask equipped with a paddle agitator and heated to boiling (100° C.) and held at reflux for 5 minutes to drive off carbon dioxide. This reaction mix was then transferred to a stainless steel autoclave equipped with an agitator and heated to 180° C. in a period of 24 minutes. Temperature was maintained at 180° C. for one hour and then the charge was cooled to 70° C. in 10 minutes and discharged from the autoclave. The fibrous alumina monohydrate fibers possessed the following properties:

$L_f$ _____ 360 millimicrons.
Specific surface area _____ 200 m.²/g.

This application is a continuation-in-part of my U.S. applications Serial Nos.: 259,123, filed November 30, 1951; 331,122, filed January 13, 1953; 399,571, filed December 21, 1953; 357,623, filed May 26, 1953; 519,559, filed July 1, 1955; and 594,265, filed June 27, 1956, all now abandoned, and my copending U.S. application Serial No. 730,025, filed April 21, 1958, now abandoned.

I claim:
1. Fibrous alumina in the form of fibrils having an average length in the range from 100 to 700 millimicrons, the remaining average dimensions being in the range from 3 to 10 millimicrons, the axial ratio being from 50:1 to 150:1, and the product having the following physical properties:

Surface area _____ 250 to 350 m.²/g.

X-ray diffraction of boehmite and the ratio of peak intensities of the product to boehmite of a surface of less than 10 m.²/g. at the 020 crystal lattice plane being less than 40:100.

2. Fibrous alumina in the form of fibrils having an average length of from 100 to 1500 millimicrons, the remaining average dimensions being in the range from 3 to 15 millimicrons, the axial ratio being from 20:1 to 300:1, and the product having the following physical properties:

Surface area _____ 200 to 400 m.²/g.

X-ray diffraction of boehmite and the ratio of peak intensities of the product to boehmite of a surface of less than 10 m.²/g. at the 020 crystal lattice plane being less than 40:100.

3. An aquasol of fibrous alumina particles as described in claim 1.

4. An aquasol of fibrous alumina particles as described in claim 2, the sol having a pH above 7.

5. A sol of fibrous alumina particles as described in claim 2.

6. Fibrous alumina monohydrate having the boehmite crystal lattice and made up of alumina fibrils which have a surface area of 200 to 400 m.²/g. and an average length of 100 to 1500 millimicrons, and having an axial ratio greater than 20:1.

7. Fibrous alumina monohydrate having the boehmite crystal lattice and made up of alumina fibrils which have a surface area of 250 to 350 m.²/g. and an average length of 100 to 700 millimicrons, and having an axial ratio greater than 20:1.

8. Fibrous alumina monohydrate having the boehmite crystal lattice and made up of alumina fibrils which by streaming birefringence have a fiber length of 200 to 2000 millimicrons, and which have an axial ratio above 20:1.

9. An aqueous dispersion of the fibrous alumina of claim 7.

10. A pulverulent, fibrous alumina monohydrate having the boehmite crystal lattice and being made up of alumina fibrils which have a surface area of 200 to 400 m.²/g., and an average length of 50 to 700 millimicrons, the axial ratio of such fibrils, by computation from the above surface area and average lengths, ranging from 7.5:1 to 210:1.

11. A readily redispersible, pulverulent fibrous alumina monohydrate having the boehmite crystal lattice and being made up of alumina fibrils which have a surface area of 200 to 400 m.²/g. and an average length of 25 to 1500 millimicrons, the axial ratio of such fibrils, by computation from the above surface areas and average lengths, ranging from 3.76:1 to 451:1.

12. A sol of particles of the fibrous alumina of claim 6.

13. An organophilic product, being preferentially wetted by n-butanol in a butanol-water mixture, comprising the product of claim 6 coated with —OR groups chemically bound thereto, R being a hydrocarbon radical of from 1 to 18 carbon atoms wherein the carbon atom attached to oxygen is also attached to hydrogen.

14. In a process for making fibrous alumina monohydrate having the boehmite crystal lattice the step comprising heating an aqueous acidic suspension of alumina under the following conditions until the alumina fibers are produced:

1. The alumina starting material is such that one-half can be dissolved at 98° C., in an excess of hydrochloric acid in a time, $\theta$, of less than one minute.

2. The system contains a monobasic acid radical having a dissociation constant greater than 0.1 at 25° C.

3. The $Al_2O_3$ content of the system is from 0.05 to 1.5 molar.

4. The acid radical concentration is no less than 0.05 molar and does not exceed 4.2 molar.

5. The said temperature of heating is 150 to 220° C.

6. The heating is continued for a time sufficient to effect a desired degree of conversion of the alumina starting material to fibrous alumina monohydrate having the boehmite crystal lattice.

15. In a process for making fibrous alumina monohydrate having the boehmite crystal lattice the step comprising heating at a temperature of 120 to 250° C. an aqueous dispersion of alumina one-half of which can be dissolved in concentrated hydrochloric acid at 98° C. in a time, $\theta$, of less than ten minutes, the aqueous dispersion containing a monobasic acid radical having a dissociation constant greater than 0.1 at 25° C., the molarity of alumina calculated as $Al_2O_3$ being at least 0.05 and not over 1.5, and the molarity of said acid radical being from:

$$0.25 \ (Al_2O_3) \text{ to } (Al_2O_3) + 0.2$$

the said heating being continued for a time sufficient to effect a desired degree of conversion of said alumina to fibrous alumina monohydrate having the boehmite crystal lattice.

16. In a process for modifying an aqueous dispersion of fibrous alumina monohydrate having the boehmite crystal lattice which contains a salt of aluminum with a monobasic acid radical having a dissociation constant greater than 0.1 at 25° C., the steps comprising raising the basicity of the aluminum salt to a ratio of $Al_2O_3$:acid radical above 1:1 by removing acid radical and then heating the dispersion to a temperature of 80 to 375° C., for a time sufficient to effect a desired degree of conversion of amorphous alumina to alumina monohydrate having the boehmite crystal lattice.

References Cited in the file of this patent

UNITED STATES PATENTS

| | | |
|---|---|---|
| 1,953,201 | Tosterud | Apr. 3, 1934 |
| 2,373,198 | Roehrich | Apr. 10, 1945 |
| 2,733,205 | Dalton et al. | Jan. 31, 1956 |
| 2,739,076 | Iler | Mar. 20, 1956 |
| 2,798,049 | White et al. | July 2, 1957 |

FOREIGN PATENTS

| | | |
|---|---|---|
| 165,052 | Great Britain | Dec. 28, 1921 |

OTHER REFERENCES

Dana: A Text of Mineralogy, pub. 1932, by Wiley, N.Y., pp. 502 and 503.

Encyclopedia of Chemical Technology, vol. 1, pub. 1947 by Interscience, N.Y., p. 642.